(12) United States Patent  
Gipson

(10) Patent No.: US 7,918,191 B2  
(45) Date of Patent: Apr. 5, 2011

(54) REMOTELY OPERABLE GATED CHUTE FOR LIVESTOCK

(76) Inventor: Tommie Carroll Gipson, Eaton, CO (US)

(*) Notice: Subject to any disclaimer, the term of this patent is extended or adjusted under 35 U.S.C. 154(b) by 0 days.

(21) Appl. No.: 12/661,245

(22) Filed: Mar. 12, 2010

(65) Prior Publication Data

US 2011/0036305 A1 Feb. 17, 2011

Related U.S. Application Data

(60) Provisional application No. 61/274,305, filed on Aug. 14, 2009, provisional application No. 61/284,274, filed on Dec. 16, 2009.

(51) Int. Cl.
*B65G 11/00* (2006.01)

(52) U.S. Cl. .................. 119/843; 119/734

(58) Field of Classification Search .............. 119/422, 119/423, 480, 481, 516, 524, 525, 843, 751, 119/752, 731, 734; 49/109  
See application file for complete search history.

(56) References Cited

U.S. PATENT DOCUMENTS

| | | | | |
|---|---|---|---|---|
| 2,396,928 A * | 3/1946 | Parsons | | 119/733 |
| 2,804,046 A * | 8/1957 | Turner | | 119/736 |
| 3,037,482 A * | 6/1962 | Jackson et al. | | 119/732 |
| 3,051,127 A * | 8/1962 | Norbury | | 119/734 |
| 3,099,249 A * | 7/1963 | Newhouse, Jr. | | 119/733 |
| 4,034,716 A * | 7/1977 | Fleming | | 119/847 |
| 4,051,811 A | 10/1977 | Smith | | |
| 4,070,988 A | 1/1978 | Smith | | |
| 4,133,295 A | 1/1979 | Jones | | |
| 4,138,968 A | 2/1979 | Ostermann | | |
| 5,101,595 A | 4/1992 | Rhoades | | |
| 5,282,441 A * | 2/1994 | Ricketts | | 119/724 |
| 5,331,923 A * | 7/1994 | Mollhagen | | 119/734 |
| 5,469,808 A * | 11/1995 | Street et al. | | 119/520 |
| 6,471,261 B1 | 10/2002 | Messler | | |
| 6,837,497 B2 | 1/2005 | Barnett | | |
| 2009/0301405 A1* | 12/2009 | Wurtz et al. | | 119/842 |
| 2010/0139568 A1* | 6/2010 | Rousseau | | 119/14.04 |

FOREIGN PATENT DOCUMENTS

CA 679671 2/1964

* cited by examiner

*Primary Examiner* — T. Nguyen  
(74) *Attorney, Agent, or Firm* — Elizabeth R. Hall

(57) ABSTRACT

One embodiment of a remotely controlled apparatus for selectably admitting a large animal into and then selectably releasing the animal from a livestock chute uses the weight of the animal as its primary energy source for opening and closing the entry and exit gates. The livestock chute has a linking mechanism for communicating with the entry gate, the exit gate, a moveable floor, and a biasing force wherein the weight of the animal is used to overcome the biasing force to open the entry gate and to store energy that can be selectively activated to open the exit gate on the livestock chute.

23 Claims, 17 Drawing Sheets

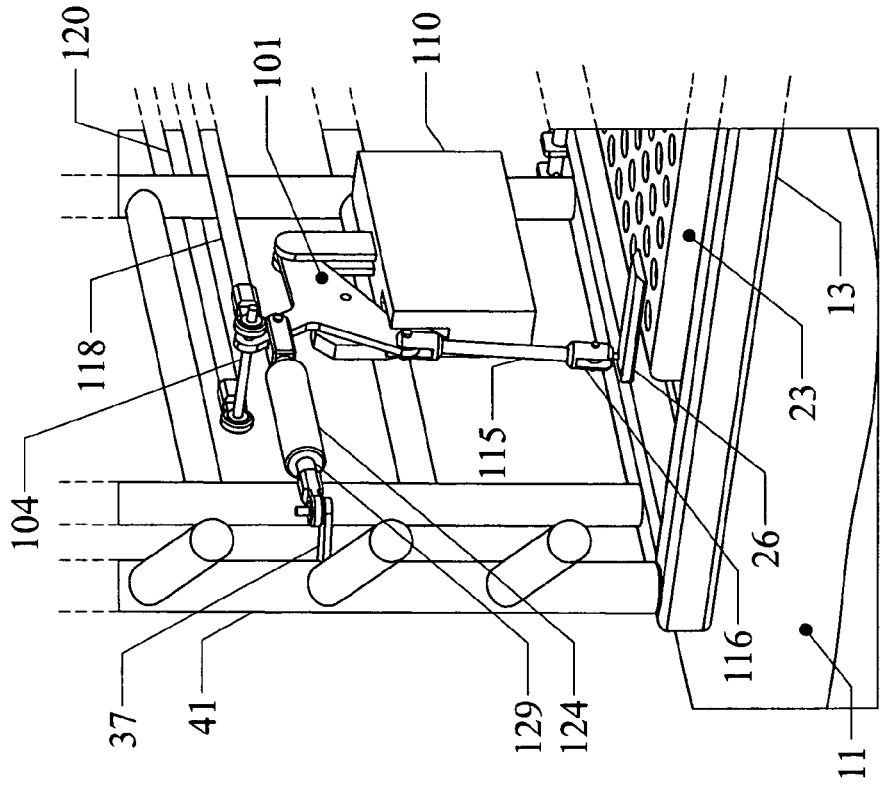
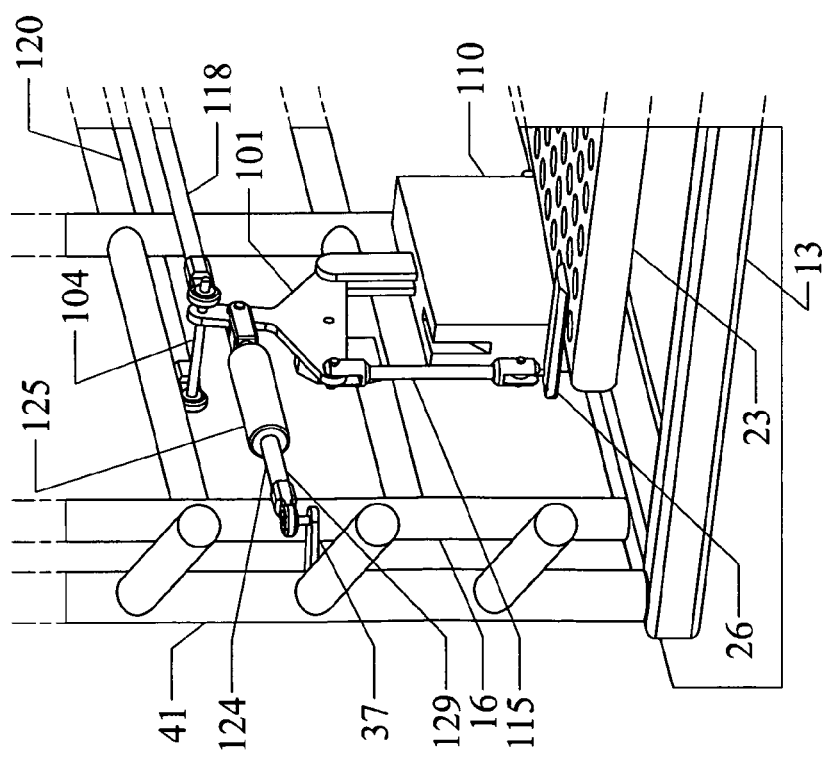

REMOTELY OPERABLE GATED CHUTE FOR LIVESTOCK

CROSS-REFERENCE TO RELATED APPLICATION

The present application, pursuant to 35 U.S.C. 111(b), claims the benefit of the earlier filing date of provisional application Ser. No. 61/274,305 filed Aug. 14, 2009, and entitled "Remotely Operable Gated Chute for Livestock" and provisional application Ser. No. 61/284,274 filed Dec. 16, 2009, and entitled "Remotely Operable Gated Livestock chute for Livestock"

BACKGROUND OF THE INVENTION

1. Field of the Invention

The present invention relates to a livestock chute wherein the primary source of energy for opening and closing the gates is provided using the weight of the livestock. In particular, the present invention relates to a livestock chute having a linking mechanism for communicating with an entry gate, an exit gate, a moveable floor, and a biasing force wherein the weight of the livestock is used to open the entry gate and to store energy that can be selectively activated to open the exit gate on the livestock chute.

2. Description of the Related Art

Rodeo contests have become popular in recent years, particularly in the western states of the United States, and many cowboys and other western riders have become highly skilled in the performance of certain cattle handling feats, such as bulldogging, steer-roping, and calf-roping. Roping, for example, is increasingly popular as a family sport and today there are more than 100,000 members in the United States Team Roping Association. Ropers often exhibit their skills in competitions where they actively compete with each other for prize money before large audiences during rodeo performances.

Generally these events requires that a steer or a calf be brought into a holding chute having a gate which can be selectably opened and closed for the entrance, retention, and release of the animal. Holding chutes provided with entry and exit gates are also traditionally used by rodeo performers to temporarily hold and release cattle for mounted roping practice.

Prior to the advent of modern controls, double gated livestock chutes were always manually operated. Currently available practice chutes have either manually operated gates or utilize an electrically powered radio-controlled system to operate one or more of the gates. The rider operates the radio-controlled system using a handheld control module which selectably operates a gate in response to radio signals activated by pressing one or more control buttons on the control module. However, the modern controls do not coordinate the opening and closing of the entry and exit gates and generally require at least one of the gates to be opened or closed manually.

This existing system not only requires one or more large, expensive batteries (i.e., a 120 volt battery) and/or a direct electrical connection to power the system, but it also requires compressed air. Typically, the roping pen and holding chute are located a considerable distance from power lines, so large batteries are used to provide the necessary power. Since the opening and closing of the gates require vast amounts of energy, the batteries used are routinely disconnected for recharging elsewhere, resulting in considerable inconvenience.

A need exists for a remotely operable holding chute which requires very little electrical power and no compressed air to operate the entrance and exit gates of the holding chute.

SUMMARY OF THE INVENTION

The present invention relates to a livestock chute for selectably admitting livestock into and then selectably releasing the admitted livestock from the livestock chute. The primary source of energy for opening and closing the entry and exit gates to the livestock chute is provided using the weight of the animal. One embodiment of the livestock chute has a linking mechanism for communicating with the entry gate, the exit gate, a moveable floor, and a biasing force wherein the weight of the livestock is used to open the entry gate and to store energy that can be selectively activated to release the exit gate on the livestock chute.

One embodiment of the present invention is a cattle chute comprising: a. a base frame having two side walls and an entry passage on a first end of the base frame and an exit passage on a second end of the base frame; b. an entry gate hingedly mounted on the first end of the base frame and moveable between an open position and a closed position; c. an exit gate hingedly mounted on the second end of the base frame and moveable between an exit open position and an exit closed position; d. a floor disposed within the base frame having a first end of the floor pivotably mounted to the base frame proximal the entry gate and adjacent a ground area located under the base frame and a second end of the floor moveable between a raised position and a lowered position closer to the ground area that the raised position; e. a linkage assembly in communication with the entry gate, the exit gate, the floor, and a biasing mechanism for applying a first biasing force to keep the entry gate in the open position and to keep the exit gate closed, wherein a force applied by an animal stepping on the floor proximal the moveable second end moves the floor into the lowered position and overcomes the first biasing force to move the entry gate to the closed position and stores a second biasing force; and f. a release mechanism for releasing the stored second biasing force to open the exit gate.

Another embodiment of the present invention is a cattle chute comprising: a. a base frame having two side walls and an entry passage on a first end of the base frame and an exit passage on a second end of the base frame; b. an entry gate hingedly mounted on the first end of the base frame and moveable between an open position and a closed position; c. an exit gate hingedly mounted on the second end of the base frame and moveable between an exit open position and an exit closed position; d. a no-return gate hingedly mounted on the base frame proximal the entry gate and moveable between an open position and a closed position; e. a floor disposed within the base frame having a first end of the floor pivotably mounted to the base frame proximal the entry gate and adjacent a ground area located under the base frame and a second end of the floor moveable between a raised position and a lowered position closer to the ground area that the raised position; f. a linkage assembly in communication with the entry gate, the exit gate, the no-return gate, the floor, and a biasing mechanism for applying a first biasing force to keep both the entry gate and the no-return gate in their open positions and to keep the exit gate closed, wherein a force applied by an animal stepping on the floor proximal its moveable second end moves the floor into the lowered position and overcomes the first biasing force to move both the entry gate and the no-return gate to their closed positions and stores a second biasing force; and g. a remotely operable release mechanism for releasing the stored second biasing force to open the exit gate.

Yet another embodiment of the present invention is A cattle chute comprising: a. a base frame having two side walls and an entry passage on a first end of the base frame and an exit passage on a second end of the base frame; b. an entry gate hingedly mounted on the first end of the base frame and moveable between an open position and a closed position; c. an exit gate hingedly mounted on a pivotable shaft proximal the second end of the base frame, wherein the exit gate is in an exit open position when the pivotable shaft is in a first shaft position and in an exit closed position when the pivotable shaft is in a second shaft position; d. a no-return gate hingedly mounted on the base frame proximal the entry gate and moveable between an open position and a closed position wherein the no-return gate is open when the entry gate is open and closed when the entry gate is closed; e. a floor disposed within the base frame having a first end of the floor pivotably mounted to the base frame proximal the entry gate and adjacent a ground area located under the base frame and a second end of the floor moveable between a raised position and a lowered position closer to the ground area that the raised position; f. a linkage assembly including (i) a rotatable operator device pivotably mounted on the base frame, (ii) a counterweight attached to the operator device biasing the rotation of the operator device in a first direction, (iii) a first link interconnecting the floor and the operator device, whereby when the floor is moved into the lowered position the first link rotates the operator device in a second direction, (iv) a second link interconnecting the entry gate and the operator device, whereby when the operator device rotates in the first direction the entry gate opens and when the operator device rotates in the second direction the entry gate closes, (v) a third link interconnecting the no-return gate and the operator device, whereby when the operator device rotates in the first direction the no-return gate opens and when the operator device rotates in the second direction the no-return gate closes, and (vi) a fourth link interconnecting the pivotable shaft with the operator device, whereby when the operator device rotates in the second direction the fourth link stores a second biasing force; and g. a release mechanism attached to the pivotable shaft for releasing the stored second biasing force to move the pivotable shaft to the first shaft position and open the exit gate.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 17 is an oblique view of one side of the closed exit gate prior to entry of an animal into the livestock chute, in which the position of the operator linkage is shown.

FIG. 18 is an oblique view of one side of the closed exit gate with the moveable floor depressed but before the exit gate is opened with the control module.

DESCRIPTION OF THE PREFERRED EMBODIMENTS

Figure 1:
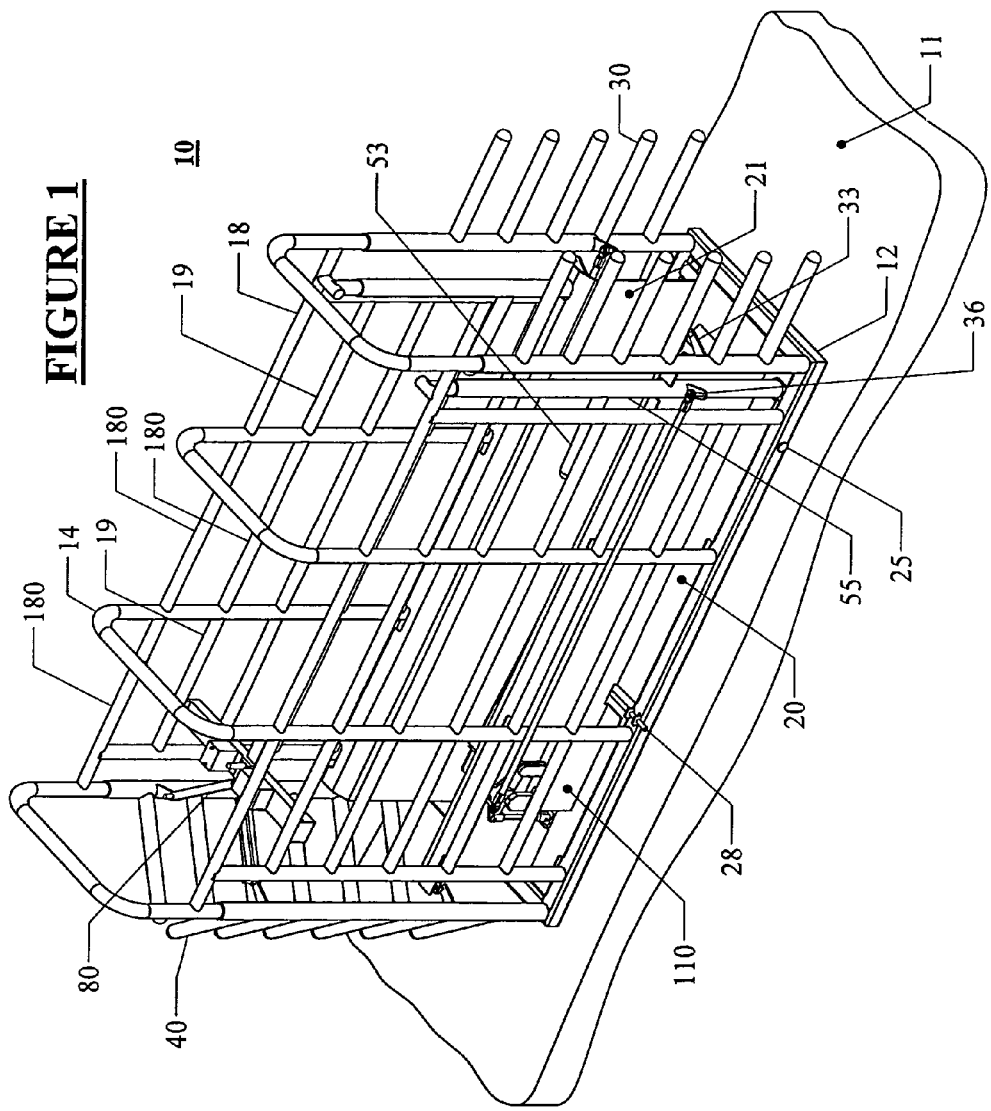
FIG. 1 is an oblique view of the livestock chute of the present invention, wherein the entry and no-return gates are open, the exit gate is closed, and the livestock chute is ready to admit an animal.

Embodiments of the present invention relate to a remotely controlled apparatus for selectably admitting a large animal into and then selectably releasing the animal from a livestock chute. The primary source of energy for opening and closing the entry and exit gates is provided using the weight of the animal. The livestock chute has a linking mechanism for communicating with the entry gate, the exit gate, a moveable floor, and a biasing force wherein the weight of the livestock is used to overcome the biasing force to open the entry gate and to store energy that can be remotely activated to open the exit gate on the livestock chute. Embodiments of the present invention are particularly useful for riders to practice their roping or other rodeo skills, but the livestock chute is also adaptable for individually weighing, medicating, or otherwise treating livestock.

The embodiment of the livestock chute 10, illustrated in FIGS. 1-5, includes a primary frame or structure 12, an entry gate assembly 30, an exit gate assembly 40, a no-return gate assembly 50, an approximately horizontally pivoted movable floor structure 23, a release mechanism 70, a rotatable linkage assembly 100 interconnecting the active elements of the chute 10, and a release mechanism 80 for selectably opening the exit gate assembly 40. The energy for operating the entry gate 30, the exit gate 40 and the no-return gate 50 of the chute 10 is primarily provided by the weight of livestock entering the chute 10 and depressing the movable floor structure 23.

Referring to FIGS. 1 to 5, the livestock chute 10 is seen in oblique, plan, side, and end views with its entry gate 30 open and its exit gate 40 closed. This is the condition of the livestock chute 10 when it is in a position to receive an animal. The primary frame 12 of the livestock chute 10 is placed on a substantially flat surface of the ground 11 with the rectangular perimeter base frame 13 bearing on the ground 11.

Basic Frame of the Livestock Chute

The livestock chute of the present invention includes a basic frame with two interconnected sides to form a livestock enclosure with an entry passage and an exit passage. It should be understood that any basic frame can be adapted for use in the livestock chute.

Although the embodiment described in detail below and shown in FIG. 1 is generally constructed of steel plates and tubes, it is recognized that any cross-sectional shape of any material which is sufficiently durable and strong can be used to construct the frame. Furthermore, the attachment of the components of the frame may be effected by welding or if desired by pipe-fitting attachment means and the like.

One embodiment of the livestock chute frame 12 is illustrated in FIGS. 1 through 5. The base 13 is elongated in the travel direction for a penned animal. The length of the base is generally selected to be approximately 120 to 130 percent of the length of a large roping calf. The width of the base frame is generally selected to be approximately 30 to 40 percent wider than the width of a large roping calf.

A horizontal pair of coaxial hinge holes 22 transverse to the longitudinal midplane of the livestock chute 10 are located at midheight in the longitudinally extending horizontal members of the base 13 proximal to the entry end of the frame 12. These hinge holes 22 are used to pivotally mount a moveable floor 23 to the base 13.

Figure 12:
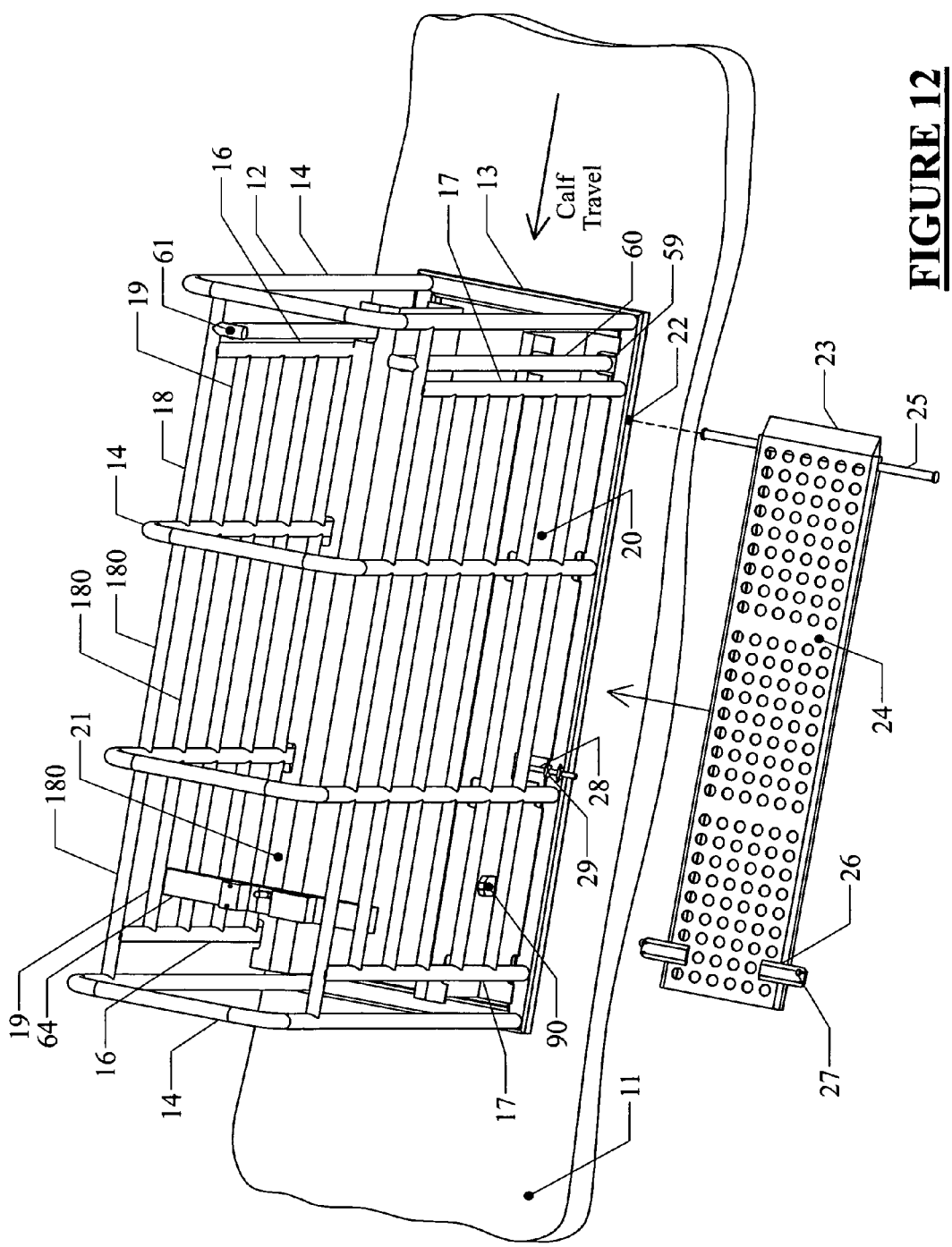
FIG. 12 is an oblique overhead view of both the structural components of the livestock chute frame and the movable floor assembly.

One embodiment of the primary frame 12, illustrated in FIG. 12, has three equispaced identical vertical transverse inverted U-shaped portals 14 spaced along a portion of the length of the base 13 starting from the exit end. The portals 14 are typically made of round steel tubing and are positioned mutually parallel to each other and perpendicular to the long sides of the base 13. A fourth portal 14, spaced parallel and farther apart than the others, is located at the entry end of the base 13. The legs of the U-shaped portals 14 are substantially vertical and have approximately the same width between as the opposed longitudinally extending tubes of the base 13, to which they are connected at their bottom ends.

Horizontal brace bars are typically used to strengthen the sides. For example, the embodiment shown in FIG. 12 has six identical horizontal circular tubular shorter brace bars 180 per lateral side of the chute 10. The shorter brace bars 180 are typically coped on their ends to permit their fitting up and welding between the adjacent vertical legs of the middle portal 14. The vertical spacing of the brace bars 180 is generally constant and the array of the brace bars 180 generally extends from about 10 inches high to an elevation equal to approximately 80 percent of the height of the portals. The overall height is chosen to prevent livestock from exiting the chute 10 upwardly in an uncontrolled manner. The tubular connections of the primary structure 12 are sufficiently strong and stiff to rigidize the assembly.

The two widely spaced adjacent portal frames 14 at the entry end of the primary structure 12 are joined by a single long horizontal tubular brace bar 18 per lateral side, with the single bars 18 located at the level of upper short brace bars 180 between the central two portals. A pair of vertical tubular members, respectively 16 on the right side of the chute and 17 on the left side of the chute, is located on each side of the primary frame 12 with one vertical member at the entry end and one at the exit end.

The first 16 and second 17 vertical tubes on the entry end of the livestock chute 10 are similarly spaced proximal the entry portal 14 towards the exit portal 14. The first 16 and second 17 vertical tubes on the exit end of the livestock chute 10 are similarly spaced proximal the exit portal 14.

The vertical tubes 16 and 17 at the entry end are mounted at their bottom ends on the upper side of the base 13 and on their upper ends to the lower side of their respective long horizontal brace tubes 18. The vertical tubes 16 and 17 at the exit end are mounted at their bottom ends on the upper side of the base 13 and on their upper ends to the lower side of their respective long horizontal brace tubes 180. These vertical bars 16 and 17 are mounted in the same plane as the vertical legs of the portals 14 on their respective sides of the primary structure 12.

Each of the vertical tubes 16 and 17 serves to support one end of five short horizontal tubular brace tubes 19. The opposed ends of these shorter tubes 19 are mounted to the nearest of the central equispaced portals 14 so that they are coplanar with their connected legs of the portal.

On the vertical interior sides of the base 13, between the vertical tubular members 16, 17 and the entry portal frame 14, are located a pair of inwardly projecting coaxial short horizontal stubs 59 of the same rectangular tubing of which the base frame is constructed. At the same spacing between the entry portal frame 14 and the vertical tubular members 16, 17, coaxial horizontal short round tubing stubs 61 project inwardly from the long horizontal brace tubes 18. The diameter of the tubing stubs 61 is typically similar to that of the long horizontal brace tubes 18. A vertical round tubular post 60 is positioned between the horizontal stub 59 and the round tubular stub 61 on each side of the livestock chute 10. The opposed posts 60 respectively serve as mounting pivots for a righthand 51 half and a lefthand 55 half of the no-return gate assembly 50.

On the exit end of the chute, the end portal frame 14 of the primary frame 12 is spaced from the adjacent central portal the same as the spacing between the two central portals. The exit portal frame 14 is joined to its adjacent central portal by a single short horizontal tubular brace bar 180 per lateral side, with the single bars 180 located at the level of upper brace bars 180 between the central two portals. On each side of the primary frame 12 adjacent the exit portal 14, a pair of vertical tubular members 16 and 17 are spaced respectively proximal to the exit portal 14 towards the entry portal 14. These vertical tubes 16 and 17 on each side of the chute each serve to support one end of five attached short horizontal tubular brace tubes 19, which are similar to but slightly shorter than the shorter brace tubes 180. The opposed ends of these short tubes 19 are mounted to the nearest of the central equispaced portals 14 so that they are coplanar with their connected legs of the portal. The heights of these bars 19 correspond to the heights of the adjacent lower five bars 180 in the central section of the basic frame 12 of the chute 10.

A pair of vertical plates is located on the upward surface of each longitudinally extending tube of the base 13. These plates serve as the floor lock pin eyes 29, have an inverted U-shaped profile and are mounted parallel to the long axis of the chute 10 and spaced apart so that each is close to an opposed lateral edge of its supporting longitudinally extending tube. The floor lock pin eyes 29 are aligned so that an axially reciprocable round floor lock pin 28 extending through their central notches will extend transverse to the longitudinal axis of the base 13. Such a pin will be closely entrapped between the U-shaped central notch of the eyes 29 and the upper surface of the longitudinally extending tubes of the base 13.

Each pair of adjacent floor lock pin eyes 29 entraps a cylindrical floor lock pin 28. A floor lock pin 28 has in its central portion a coplanar transverse cross pin which serves both as a travel stop and as a gripping aid. The cross pin of the floor lock pin 28 is positioned horizontally and is located between its pair of spaced apart mounting pin eyes 29 so that its floor lock pin is retained thereby. The floor lock pins 28 can be extended manually to prevent the movable floor assembly 23 from being depressed by the weight of an animal. When the floor lock pins 28 are retracted manually, the movable floor assembly 23 is free to rotate about its hinge tube 25.

Figure 2:
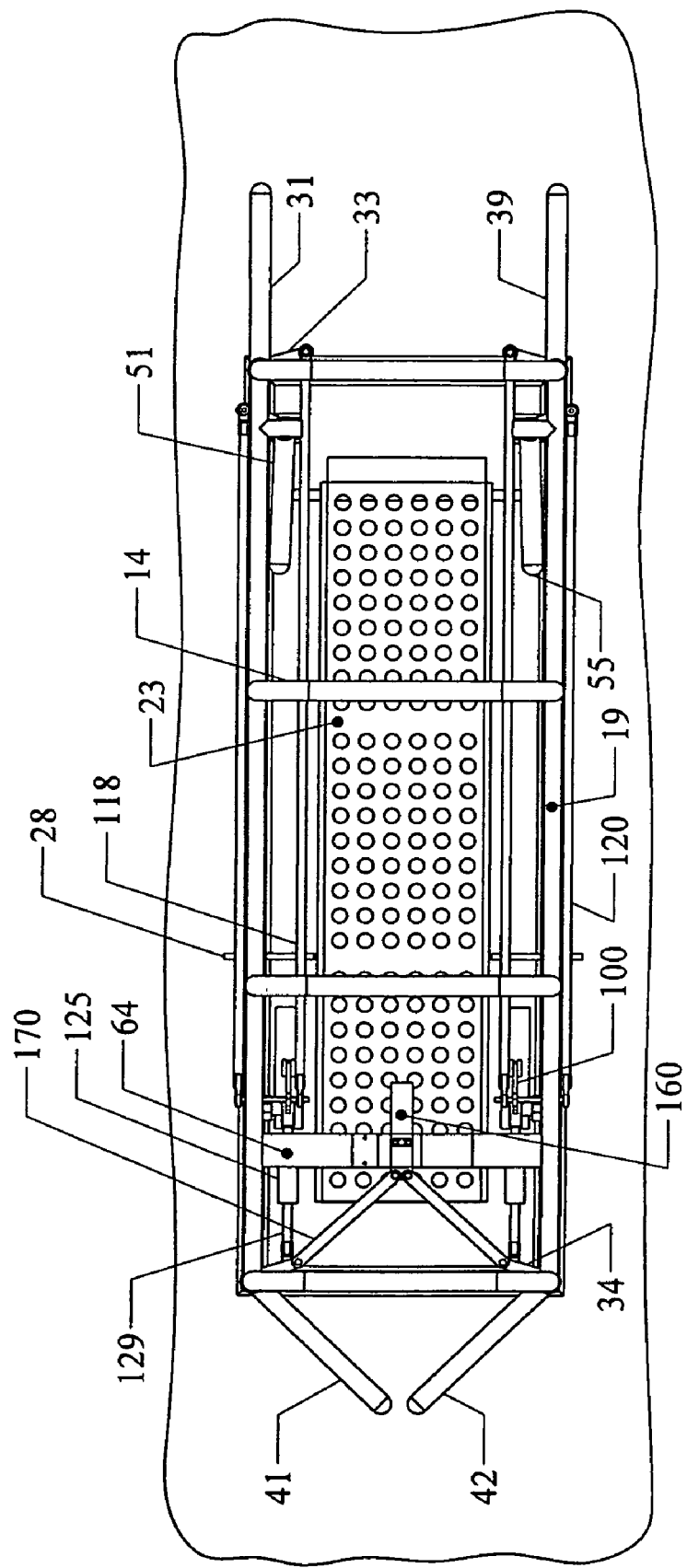
FIG. 2 is a plan view of the livestock chute of FIG. 1, with the protective covers removed for clarity.
Figure 3:
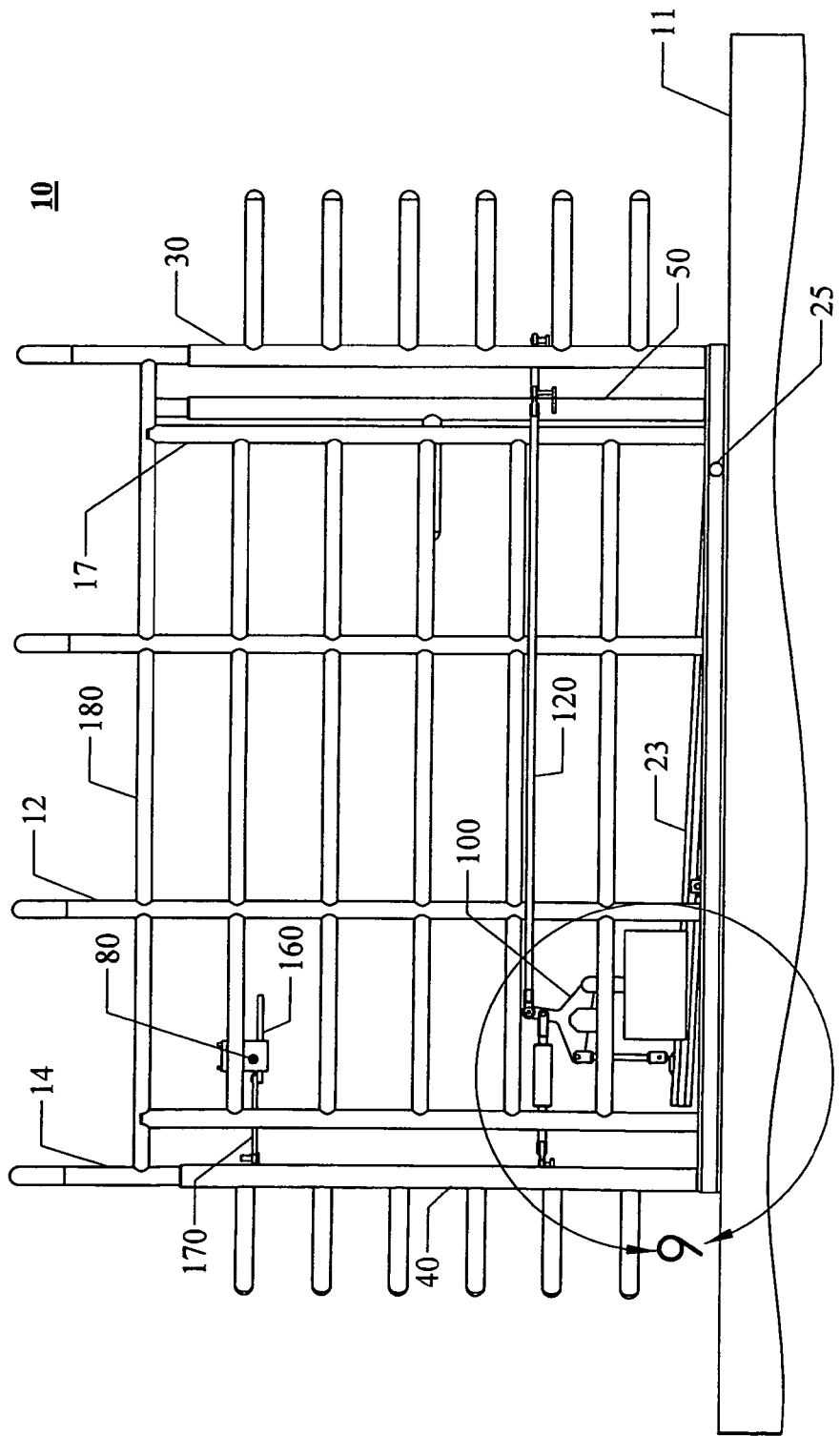
FIG. 3 is a side profile view taken of the livestock chute of FIG. 2.

Referring to FIGS. 2 and 12, a solenoid mounting bar 64 is seen to span horizontally and transverse to the longitudinal midplane of the chute 10 between the upper two horizontal brace tubes 19 located nearest the exit end of the chute. The solenoid mounting bar 64, seen in more detail in FIG. 13, has a hollow rectangular cross-section with its wider faces horizontal, and bar 64 is symmetrical about the longitudinal midplane of the chute 10. In the middle of the solenoid mounting bar 64, a transverse horizontal rectangular through hole 152 for a drive bar 160 coaxially penetrates each narrow vertical side of the cross tube to create a coaxial horizontal passage located on the longitudinal vertical midplane of the chute 10. A rectangular cross-section drive bar 160, discussed in the later description of the actuation means, has a slip fit with the through holes 152 of the solenoid mounting bar 64.

Figure 13:
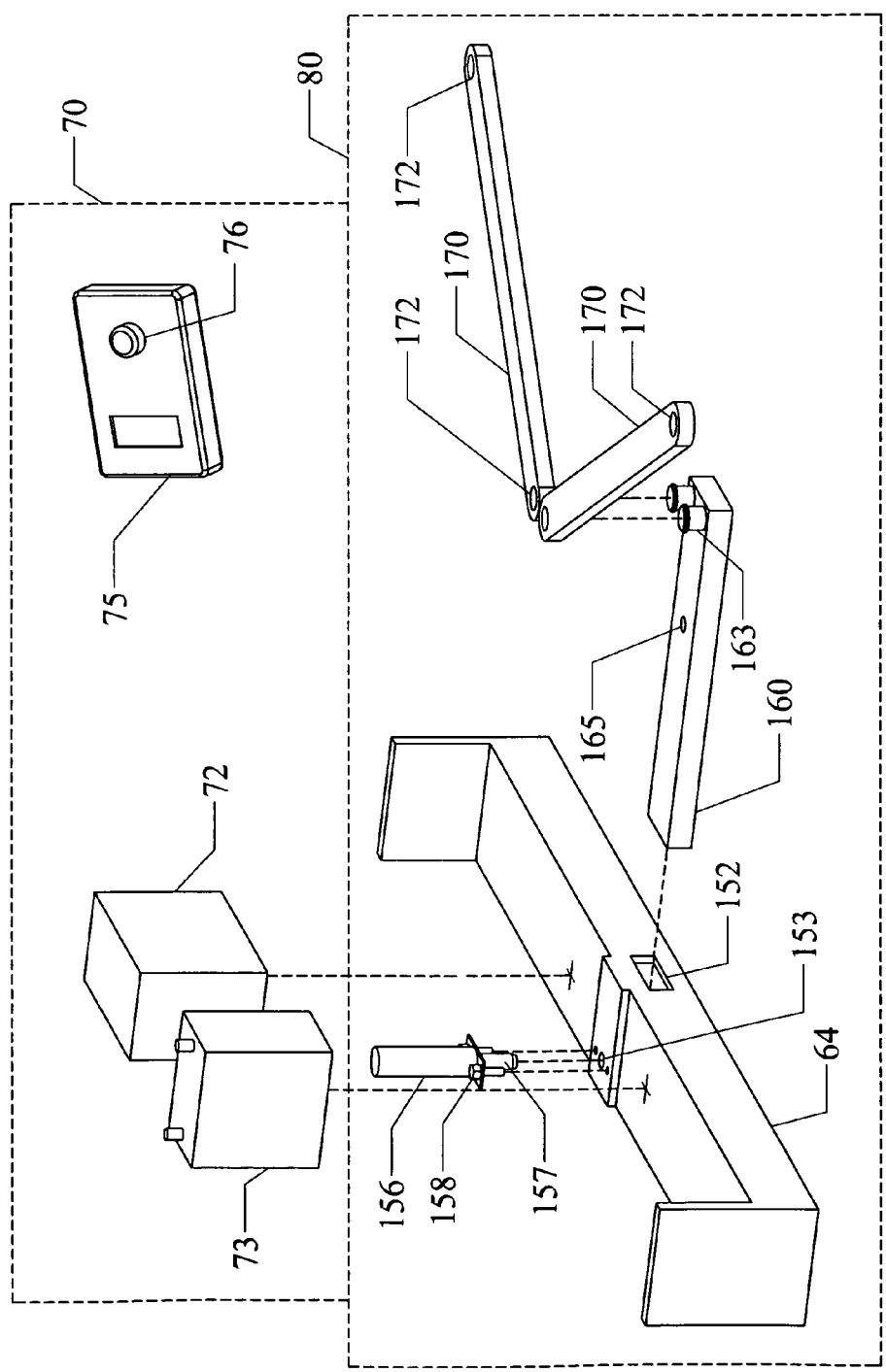
FIG. 13 is an exploded oblique view of the selectably operable control system of the livestock chute and its mounting bar.

Midlength of the upper horizontal flat surface of the solenoid mounting bar 64 is a rectangular thickened pad for mounting of a solenoid 156. The pad has a vertical clearance hole 153 for permitting vertical reciprocation of a downwardly extending solenoid plunger 157. The clearance hole 153 penetrates only the pad. The hole 153 is located on the entrance side of the mounting bar 64 on the transverse vertical midplane of the bar. The pad of the solenoid mounting bar 64 also has a pair of drilled and tapped mounting holes for threaded engagement by solenoid mounting screws 158. The mounting screws extend through a transverse horizontal flange on the lower end of the housing of a solenoid 156, as seen in FIG. 13.

A pair of opposed flat plate operator mounts 90 are welded parallel to the longitudinal vertical midplane of the chute 10 onto the lowest short horizontal tubes 19 near the exit side of the primary frame 12. Each of these opposed inwardly facing operator mount plates 90 has a horizontally inwardly projecting cylindrical fixed shaft; the shafts of the plates 90 are positioned coaxially. Each operator mount 90 supports a rotationally free operator linkage assembly 100 on its shaft.

Most of the mechanism of the operator linkage assembly 100 is located on the interior sides of the livestock chute 10. In order to avoid injury to the livestock passing through the chute, lefthand 20 and righthand 21 protective covers are provided over the operator linkage assembly. The protective covers 20 and 21 are shown in FIGS. 1, 4, and 12, but are omitted from other views in order to better display the mechanisms and operation of the chute 10.

Figure 4:
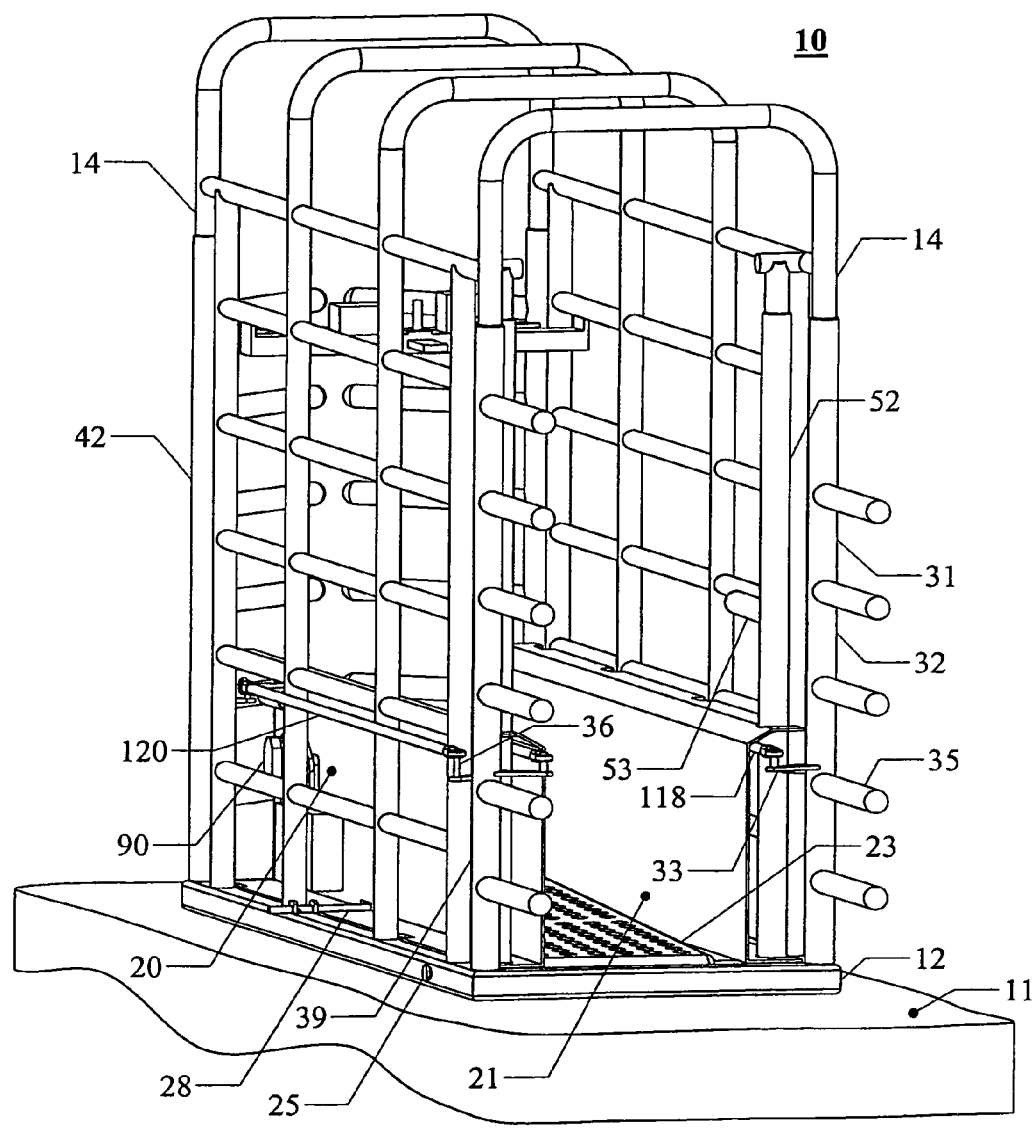
FIG. 4 is an oblique end view taken from the entry side of the livestock chute of FIG. 1.

Referring to FIG. 4, the protective covers 20 and 21 are seen to be elongated press-broken thin plates having short horizontally outwardly extending upper and lower flanges, long vertical lower faces attached to their lower flanges and extending almost to the lateral sides of the movable floor assembly 23, and outwardly and upwardly inclined faces which extend to the shorter upper flanges. The protective covers 20 and 21 have multiple vertically extending notches through their upper and lower flanges in order to clear the portals 14 of the chute, as well as the operator linkage assemblies 100.

The width of the base 13 and the U-shaped portals 14 of the primary frame12 is preselected, so that insufficient space is available to permit livestock enclosed within the chute to turn around in the chute 10. The spacing between horizontal brace tubes 18, 180, and 19 is sufficiently close that confined livestock cannot escape between adjacent portals 14.

The Movable Floor Plate Assembly

One end of a moveable floor plate assembly is downwardly depressed to capture energy from the weight of livestock standing of the floor plate assembly. The floor plate assembly can be constructed of a variety of materials and in a variety of ways.

Figure 5:
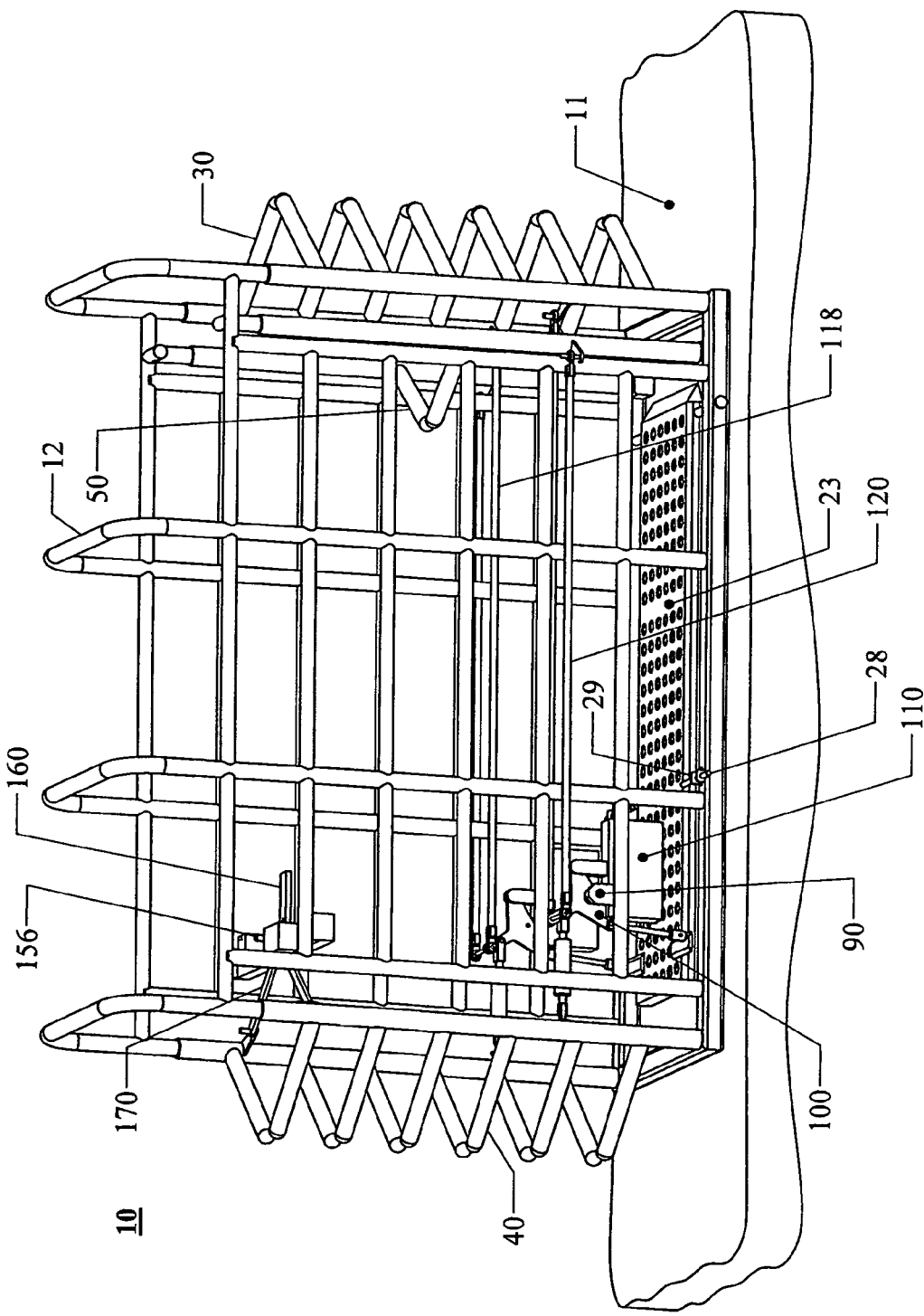
FIG. 5 is an oblique side view of the livestock chute with the entry gate and the no-return gate closed by the weight of an animal depressing the movable floor assembly. To better show the operative mechanisms of the livestock chute, the protective covers are removed.

One embodiment of the moveable floor plate assembly 23 is shown in FIGS. 5 and 12. The moveable floor plate assembly 23 consists of a stiffened elongated movable floor plate 24, a transverse hinge tube 25 mounted at midheight of the perimeter stiffening bars near a first end of the floor plate assembly, and opposed outwardly extending side brackets 26 mounted on the upper side adjacent the end opposed to the hinge tube 25.

The transverse hinge tube 25 is pivotably mounted in the horizontal coaxial opposed transverse holes 22 in the longitudinally extending perimeter stiffening members of the base 13. This permits the exit end of the movable floor plate assembly 23 to be pivotably depressed by an animal standing on the upper surface of the assembly.

The movable floor plate assembly 23 has its perimeter stiffened by downwardly extending welded perimeter plates which are normal to the planar upper surface of the floor plate 24. The upper surface plate 24 of the floor plate assembly 23 is perforated to ease cleaning of the chute 10. The width of the floor plate assembly 23 is such that it has a close fit between the interior faces of the longitudinally extending protective covers 20, 21 of the base 13, while its length is generally approximately 75 to 90 percent of the length of the chute 10. The close fit is to prevent entrapment of a foot of enclosed livestock such as a calf.

The floor plate assembly 23 is provided with a hinge tube 25 which is horizontal and extends through the long side perimeter plates normal to the longitudinal vertical midplane of the floor plate 24 adjacent a first end of the assembly. The first end of the floor plate assembly 23 is positioned close to the entry end of the chute 10. At the lateral sides on the end of each floor plate assembly 23 opposed to the end having the hinge tube 25 are located mirror image side brackets 26. Each side bracket is a flat plate welded to the upper surface of the movable floor plate assembly 23 near its second, exit end.

A side bracket 26 extends transverse to the floor plate 24 midplane outwardly beyond the lateral edge of the movable floor assembly 23. A drilled and tapped hole perpendicular to the plane of the floor plate and adjacent the distal end of each side bracket 26 threadedly engages an upwardly extending eye screw 27.

The movable floor assembly 23 is in a position inclining slightly upwardly from its pivoting hinge tube 25 whenever a calf or other livestock is not present in the chute. The movable floor assembly 23 is readily pressed downwardly to a horizontal position by the weight of a calf or other livestock. Because the weight and moment arm of the movable floor assembly 23 are relatively large, it is necessary to provide a pair of counterweights with the operator linkage assemblies 100 to automatically raise the movable floor assembly whenever the chute is empty.

The Gates

The livestock chute 10 has both an entry gate assembly 30 and an exit gate assembly 40 located at opposed ends of the chute 10. An optional no-return gate assembly 50 is located a short distance away from the entry gate assembly 30 towards the exit gate. The gates can be constructed in a variety of ways and of a variety of materials.

One embodiment of the entry, exit, and no-return gates are shown in FIG. 5. The components of each gate assembly 30, 40, 50 are substantially similar, with each gate assembly utilizing a mirror image pair of lefthand and righthand assemblies. The only differences between the integral actuating eccentric arms of the gate assemblies 30, 40, and 50 are limited to the number and positioning of eccentric arms which permit torque to be applied to either open or close and bias each gate half. Each gate consists of mirror image righthand and lefthand halves which are mounted to and have a rotational fit between the bores of their main vertical tubes 32 or 52 and the outer diameter of their mounting leg of a portal 14 or a post 60.

The righthand gate half 31 of the entry gate 30, as for all four gate halves 31 and 39 of the entry gate 30 and 41 and 42 of the exit gate 40, has its vertical main tube 32 and the horizontal finger tubes 35 assembled as follows. The horizontal finger tubes 35, which are typically the same diameter or smaller than the diameter of the cylindrical vertical main tube 32, are coped on one end to permit them to be closely fitted and welded to their main tube. The other end of each of the horizontal finger tubes 35 has a hemispherical closure cap to avoid injury to calves passing through the gates.

Figure 6:
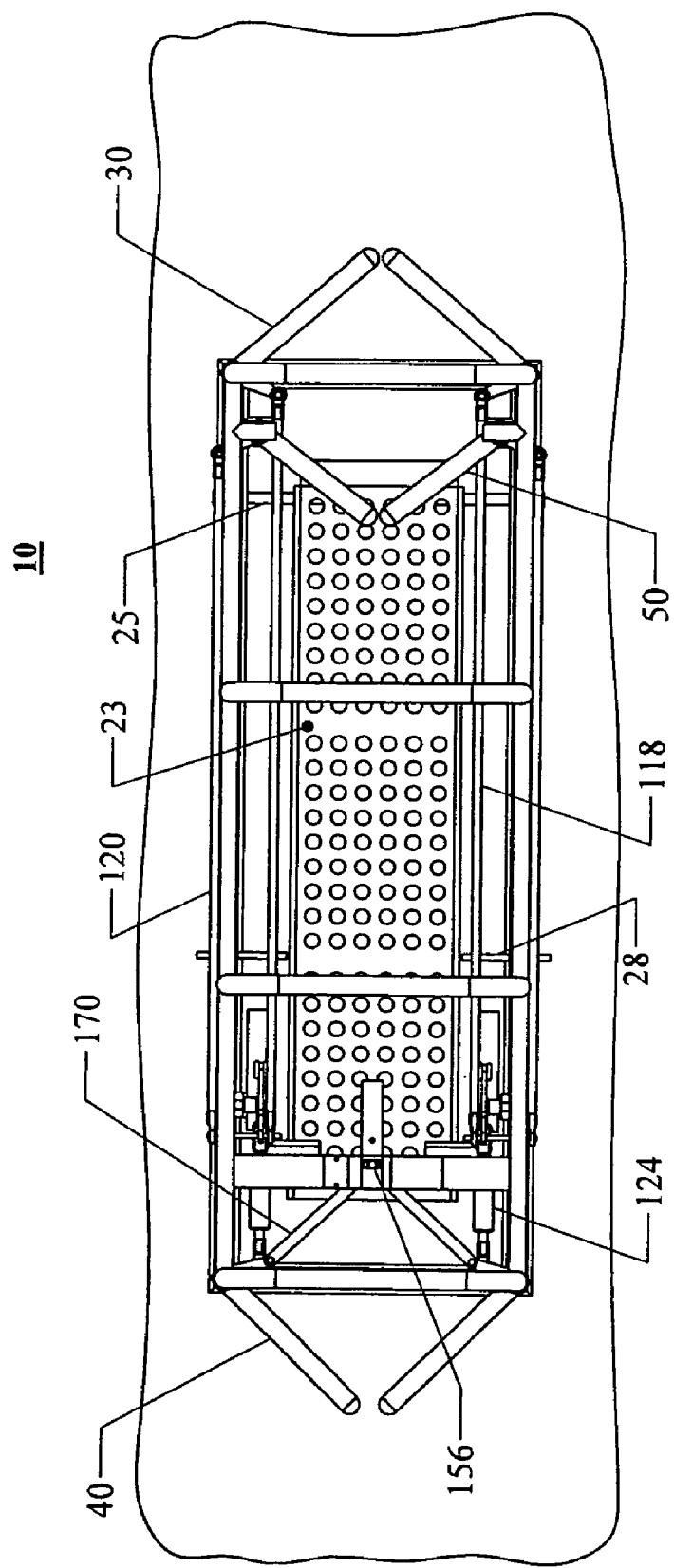
FIG. 6 is a plan view of the livestock chute of FIG. 5.
Figure 7:
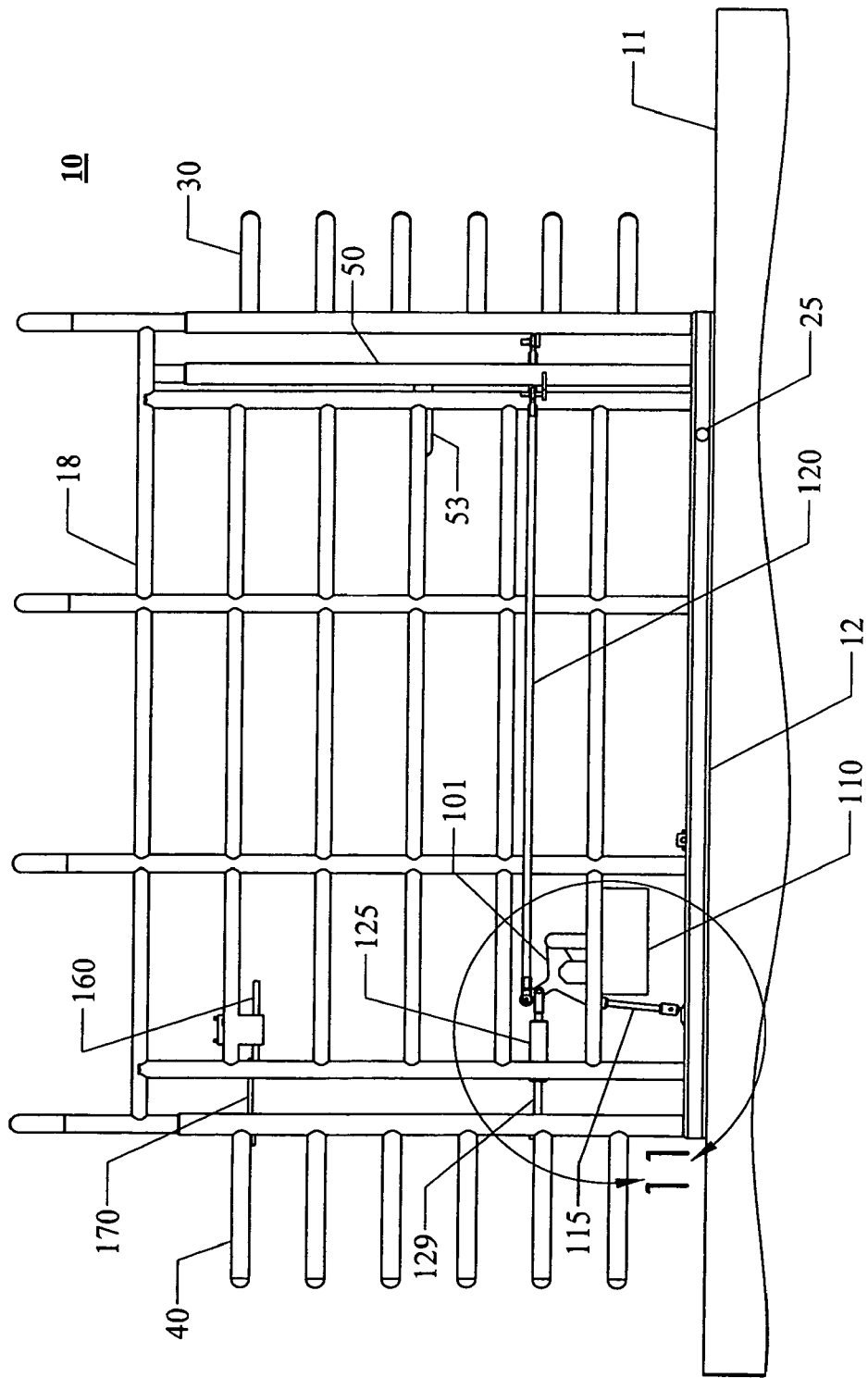
FIG. 7 is a side profile view of the livestock chute with the entry gate and the no-return gate still closed by the weight of an animal depressing the movable floor assembly and the exit gate opened by a radio signal from a handheld device. For clarity, the protective covers removed.

The finger tubes 35 are mounted in a regularly spaced vertical coplanar array centralized on the length of their main tube 32. The plane of the finger tube 35 array is coplanar with the axis of the main tube. The array of finger tubes 35 is vertically inwardly spaced by a few inches from the ends of its mounting main tube 32. The length of the finger tubes 35 is such that when the mounting planes of the finger tubes of a pair of mirror image gate halves 31 and 39 or 41 and 42 are positioned 90° apart and mutually 45° from the longitudinal vertical midplane of the primary frame 12, the rounded ends of the tubes nearly touch. This can be seen in FIGS. 5 and 6.

FIG. 2 illustrates the first eccentric arms 33 for the gate halves 31, 39 of the entry gate assembly 30 are the same. The first eccentric arm 33 is approximately an isosceles horizontal triangular plate having a circular arcuate cutout centered on its unequal side and a transverse upwardly extending cylindrical pin symmetrically set adjacent its outer end inwardly from the intersection of the two equal sides. The arcuate cutout has a close fit to the exterior of the main vertical tube 32, to which it is welded. The outer intersection of the equal sides of the plate is then radiused. The upwardly extending cylindrical vertical pin may be provided with an annular snap ring groove and a snap ring (not shown) close to its upper end for retention of the end fitting of an entry gate operating rod 118.

The first eccentric arm 33 is welded at its arcuate cutout edge to its main tube 32 spaced upwardly from the lower end of a gate half 31, 39 so that the cylindrical pin projects upwardly parallel to the axis of the main tube. The angle between the vertical plane of symmetry of the first eccentric arm 33 and the vertical plane of the array of finger tubes 34 is approximately 67.5° for the mirror image righthand 31 and lefthand 39 entry gate halves.

Figure 15:
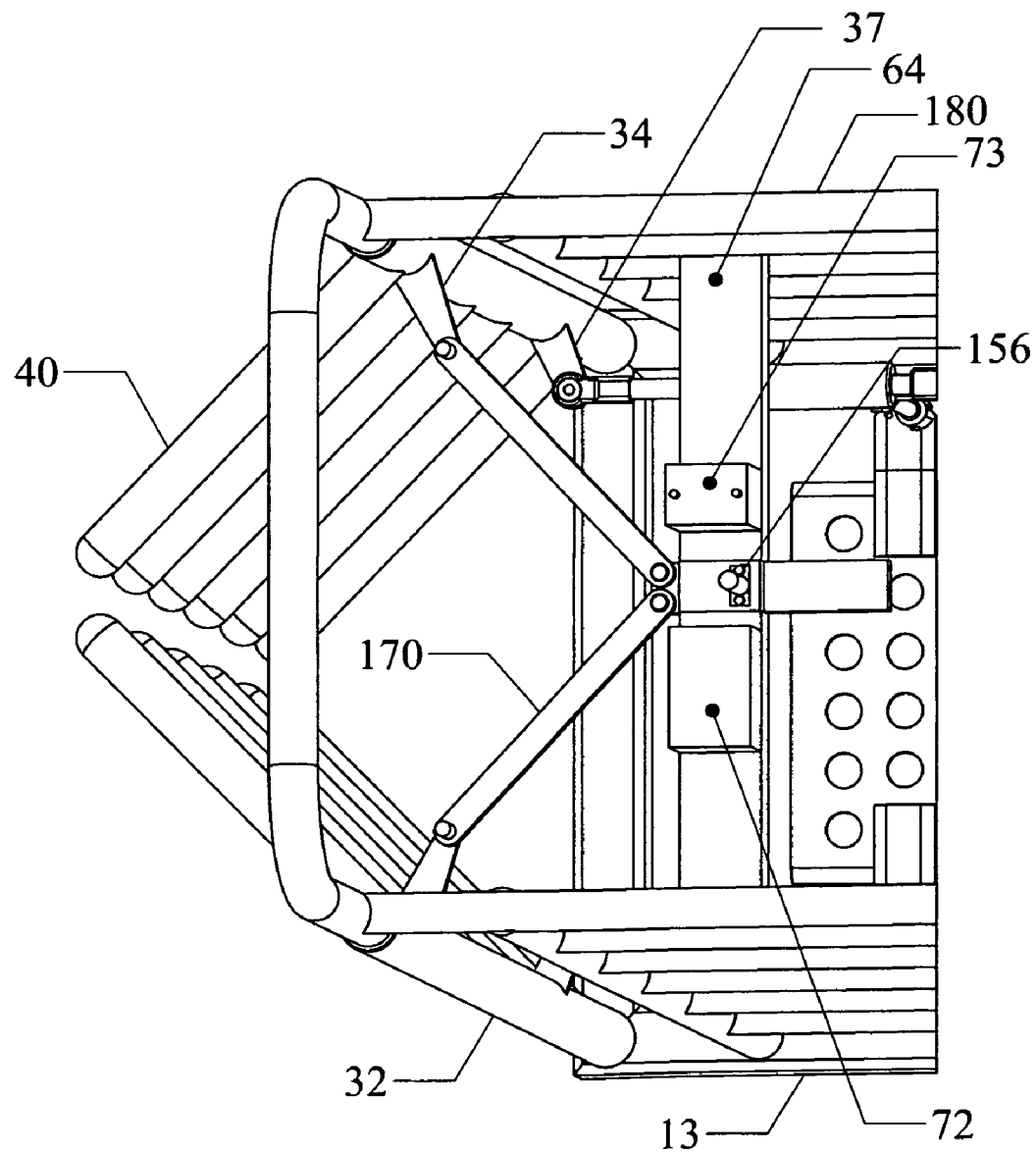
FIG. 15 is an oblique overhead view showing the installed selectably operable control assembly with its linkage attached to the exit gate of the livestock chute.

The righthand exit gate half 41 is almost identical to the lefthand entry gate half 39, with the exception of the use of a second, slightly lower eccentric arm 37 in place of the first eccentric arm 33 and the addition of a additional third eccentric arm 34. The second 37 and third 34 eccentric arms are located in the same vertical plane. As is the case for the entry gate halves 31, 39, the lefthand exit gate half 42 is the mirror image of the righthand exit gate half 41. Reference to FIGS. 4 and 15 will aid in illustrating the eccentric arm locations for the exit gate and the entry gate.

The no-return gate assembly 50 consists of a righthand no-return gate half 51 and a lefthand no-return gate half 55, with the gate halves being mirror images of each other. Each no-return gate assembly half 51 and 55 has a cylindrical vertical main tube 52 and a single short horizontal finger tube 53 similar to but shorter than the horizontal finger tubes 35 of the entry 30 and exit 40 gates. The finger tube 53 is located at approximately midheight of the main tube 52, while the fourth eccentric arm 36 is located at 112.5 degrees from the plane of the finger tube 53 and at a height similar to that used for the first eccentric arms 33 for the entry gate assembly 30. For the no-return gate assembly 50, the main tubes 52 of the righthand half 51 and the lefthand half 55 are each journaled on a no-return gate post 60 slightly inwardly from the entry portal 14 of the livestock chute 10. The function of the no-return gate assembly 50 is to prevent an animal from backing out of the chute.

Actuator Control Assembly

The livestock chute has a release mechanism whereby a person can remotely release stored energy derived from depressing the moveable floor assembly to open the exit gate. There are a variety of mechanisms that can be used such as an automobile trunk latch, or a remote controlled plunger. One embodiment of the release mechanism is shown in FIG. 13 and described in detail below.

FIG. 13 shows an actuator control assembly 70 for the chute 10 consisting of three parts: the selectably operable electronic electrical control assembly 72, an electrical storage battery 73, and a remotely operated handheld radio control module 75. The electronic electrical control assembly 72 includes a weatherproof electronic control module box which has an integral radio receiver as well as control logic and power switching capability. An electrical storage battery 73 is used for providing electrical power to the control assembly 72 and also selectably applies power to operate a solenoid 156 used as an exit gate 40 opener.

Electrical wiring connects the control module 72 to the solenoid 156. This wiring is not shown for clarity, but may be understood readily by those skilled in controls. A separate handheld control unit 75 comparable to a garage door opener control having a short range is carried by a rider on a horse or a helper. The handheld control unit 75, shown in FIG. 13, has a single operating button 76 which, when pressed to make internal electrical contact, causes transmission of a radio signal to the radio receiver in the electronic electrical control module box 72. The electronic electrical control module 72 and the battery 53 are mounted on the upper surface of the transverse solenoid mounting bar 64 of the primary framework 12.

The electronic handheld control module 75 has a radio transmitter tuned to the frequency emitted by the stationary control module 72. Preferably the transmitter will have a range in excess of 165 feet (50 meters). Whenever the receiver in module 72 is able to detect a signal from the handheld control unit 75, its circuitry causes it to switch on electrical power to the non-latching solenoid 156 of the operator mechanical linkage components 80 for a short period.

The solenoid 156 has its plunger 157 spring biased to be extended when the solenoid is not energized. The application of the appropriate electrical voltage and current retract the solenoid plunger 157, thereby enabling it to disengage from the solenoid detent 165 of the drive bar 160 and thereby release the spring-biased exit gate 40 actuation means or rod assembly 124. Electrical wiring provides power from the battery 73 to the control module 72.

Operator Mechanical Linkage Components

The details of the operator mechanical linkage components 80 are best seen in FIGS. 13 and 15. These components include a solenoid 156, a drive bar 160 and its associated linkage components pins 163 and swing bars 170. The vertical end holes 172 of the swing bars 170 attach to the upwardly extending vertical pins of the third eccentric arms 34 of the halves 41 and 42 of the exit gate 40.

The solenoid 156 is mounted to the top of the reinforced pad in the center of the upper surface of the solenoid mounting bar 64 of the primary structure 12 of the chute 10. The solenoid 156 is positioned with its downwardly extending armature or plunger 157 concentric with the vertical clearance hole 153 in that mounting surface. The solenoid 156 has a tubular housing with a transverse horizontal flange having a pair of mounting screw holes. The solenoid housing contains an annular coil, a helical compression spring, and a cylindrical plunger having a tapered lower edge and a transverse outwardly extending flange in its midsection. These details are not shown herein but are described below, as the solenoid has a standard normally spring-extended, non-latching construction.

The coil of the solenoid 156 is located in the upper part of the solenoid housing with the spring located below it. The spring bears on the lower end of the coil and the upper side of the flange of the plunger 157 to bias the plunger downwardly. An inward extension of the flange of the solenoid housing retains the plunger within the housing. Mounting screws 158 are engaged in the holes through the flange of the solenoid housing and in the drilled and tapped holes in the upper surface of the solenoid mounting bar 64. Solenoid 156 is normally extended, but the application of appropriate electrical current to its coil causes it to retract its plunger 157.

The drive bar 160 has a rectangular cross-section horizontal bar which is wider than it is thick. The drive bar 160 is deployed and freely reciprocable in the through holes 152 of the solenoid mounting bar 64. Slightly inset from the first end on the upper surface of the drive bar 160, a pair of short vertical upwardly extending cylindrical pivot pins 163 is spaced apart from each other in a pattern mirror imaged about the longitudinal midplane of the drive bar. A solenoid detent vertical through hole 165 is located on the longitudinal centerline of the drive bar 160 in the middle portion of the bar. The hole 165 has a loose slip fit with the plunger 157 of the solenoid 156.

The two swing bars 170 are identical horizontally extending rectangular cross-section bars with their vertical end corners rounded and vertical axis end holes 172 located on the longitudinal midplane at both ends. The holes 172 at the first end of the two swing bars 170 are each engaged with one of the vertical pivot pins 163 of the drive bar 160. The holes 172 at the second end of the two swing bars 170 are then engaged over the vertical cylindrical pins of the third eccentric arms 34 of the exit gate halves 41 and 42. The swing bars 170 are not crossed, but are positioned horizontally in a mirror image pattern symmetrical about the longitudinal vertical midplane of the chute 10.

An Operator Linkage Assembly

The gates of the chute 10 are interconnected with an operator linkage assembly and with a first biasing force selected to keep the entry gate open and the exit gate closed. Whenever an animal steps on the floor proximal the exit gate, the weight of the animal overcomes the first biasing force to close the entry gate and stores a second biasing force. The release mechanism described above can then be activated to remotely release the second stored biasing force to open the exit gate.

One embodiment of the linkage assembly 100 is best seen in FIGS. 9, 10, 11, 14, and 16 to 19. The linkage assembly 100 interconnects the gate assemblies 30, 40, 50 and the movable floor assembly. A linkage assembly 100 is mounted on each side of the chute 10. The primary components of each of the two linkage assemblies necessary for chute 10 operation are the rotating operator pin plate 101, the counterweight 110, the floor link 115, the entry gate rod 118, the no-return gate rod 120, and the exit gate rod assembly 124.

Figure 16:
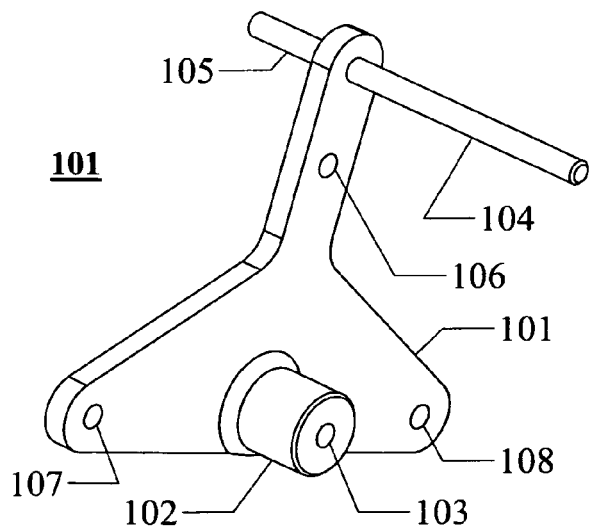
FIG. 16 is an oblique detail view showing the rotating pin plate of operator linkage assembly of FIG. 14.

Referring to FIG. 16, the rotating pin plate 101 is seen from its exterior side. The profile of the rotating pin plate 101 resembles an inverted tee shape, with symmetry about a vertical midplane plane transverse to the plate and centered on the upwardly extending leg of the tee. A cylindrical support boss 102 with a coaxial mounting pin hole 103 extends perpendicular to the plate of the rotating pin plate 101 on its outward side where the crossbar and the vertical leg of the tee intersect. Cylindrical pin hole 103 journals an inwardly extending pin of an operator mount 90 mounted on the lowest shortest horizontal brace tube 19 at the exit end of the chute so that the rotating pin plate 101 is able to pivot.

A pair of opposed through holes 107, 108 normal to the plate surface are located near the outer tips of the arms of the tee, while another through hole 106 is located on the transverse plane of symmetry approximately 70% of the length the leg of the tee from the intersection of the arms and the leg. Cylindrical hole 107 serves as a mounting hole for the attachment of floor link 115 to the movable floor, while cylindrical hole 108 serves as a mounting hole for the attachment of the counterweight 110. Hole 106 is the mounting hole for attachment of the exit gate rod assembly 124.

Adjacent the upper end of the leg of the inverted tee of the rotating pin plate 101, opposed coaxial cylindrical pins 104 and 105 extend outwardly perpendicular to the plane of the rotating pin plate. The no-return gate cylindrical pin 104 is the longer of the pins and serves to journal the bore of a swiveling end fitting 119 of the no-return gate rod 120. The entry gate cylindrical pin 105 serves to journal the bore of a swiveling end fitting 119 of the entry gate rod 118. When installed on the cylindrical pin of the operator mount 90, the support boss 102 and the no-return gate cylindrical pin 104 face the outward side of the chute, while the entry gate cylindrical pin 105 is on the inboard side of the chute 10.

Figure 14:
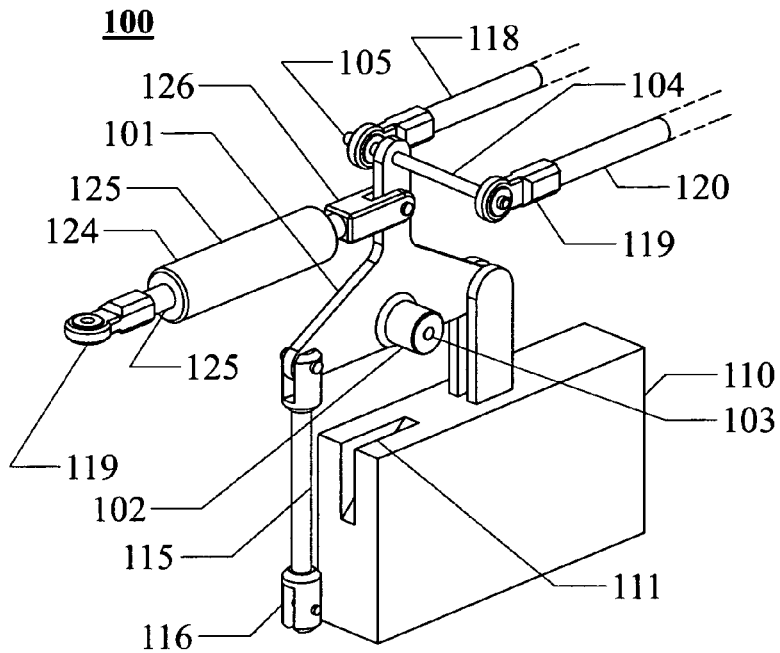
FIG. 14 is an oblique view of the operator linkage assembly.

FIG. 14 shows the linkage assembly 100 with the rotating pin plate 101 and its attached counterweight 110, floor link 115, entry gate rod 118, no-return gate rod 120, and the exit gate rod assembly 124. The floor link 115 has a short cylindrical midsection rod having opposed jaw type end fittings 116 mounted coaxially on its opposed ends. The jaw type end fittings 116 are short right circular cylindrical sections having a diametrical notch for most of their length. The notch is sufficiently wide to clear the thickness of the rotating pin plate 101. Each end fitting 116 has a short cylindrical pin spanning its outwardly oriented jaw opening; the pin axes of the end fittings are parallel and perpendicular to the axis of the floor link 115. The pin of the lower end fitting 116 of a floor link 115 is engaged through an eyescrew 27 of the movable floor assembly 23, while the upper end fitting 116 has its pin engaged in a mounting hole 107 of the rotating pin plate 101 which is on the same side of the chute 10 as the eyescrew 27 engaged by the lower pin.

The counterweight 110 is a rectangular prismatic metal block having a clearance notch 111 on the midplane of its plate-like block. The notch 111 is located on an upper corner of the counterweight. A pair of vertically extending identical flat pin plates attached to opposed sides of the counterweight parallel to the notch 111 is located in alignment with the center of gravity of the counterweight 110. A cylindrical pin transverse to the opposed pin plates and located aligned with the center of gravity of the counterweight 110 is engaged with the mounting hole 108 of the rotating pin plate 101. The combined weight of the two counterweights 110 is selected to be sufficient to exceed the weight induced moment of the movable floor assembly 23 about its hinge tube 25 when the chute is empty.

Figure 22:
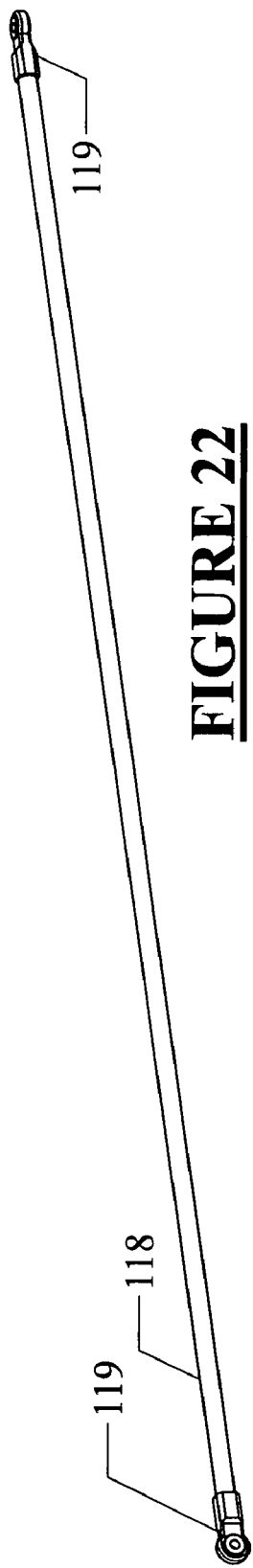
FIG. 22 is an oblique view of an entry gate rod.

The entry gate rod 118 shown in FIG. 22 is an elongated steel rod or tube sufficiently stiff to resist axial buckling under preselected axial loads. A swiveling end fitting 119 is coaxially attached to each end of the entry gate rod 118, with the two swiveling end fittings rotated 90° relative to each other. The identical swiveling end fittings 119 each have a rotationally free entrapped ball segment engaged in their distal ends. The ball segments have symmetrical diametrically opposed flats penetrated by a perpendicular cylindrical hole passing through the center of the ball. The cylindrical holes in the balls of the swiveling end fittings 119 are a close sliding fit to both the upwardly extending pin of the first eccentric arm 33 of the entry gate 30 and the entry gate cylindrical pin 105 of the rotating pin plate 101. As seen in FIGS. 4 and 5, two entry gate rods 118 interconnect the pins 105 of the rotating pin plates 101 and the first eccentric arms 33 of the entry gate halves 31, 39.

Figure 23:
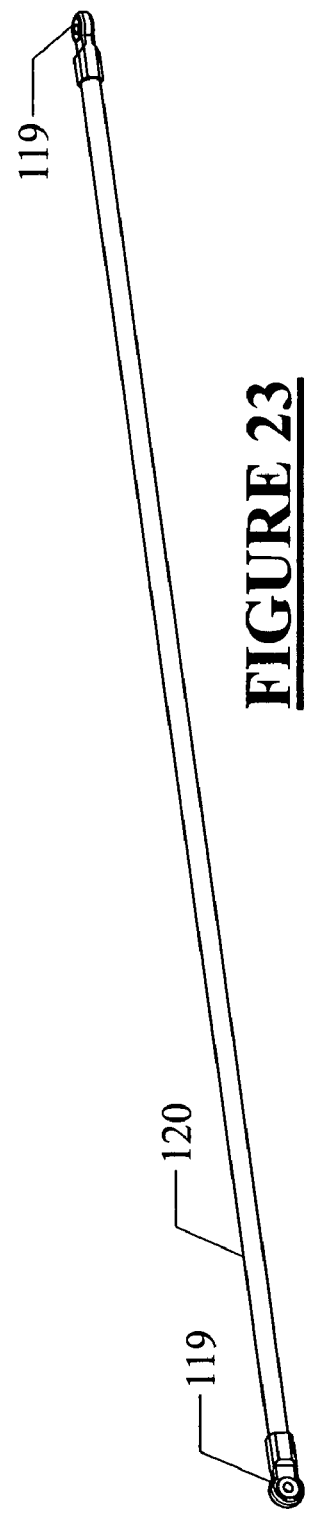
FIG. 23 is an oblique view of a no-return gate rod.

The no-return gate rod 120 shown in FIG. 23 is an elongated steel rod or tube sufficiently stiff to resist axial buckling under preselected axial loads. A swiveling end fitting 119 is coaxially attached to each end of the no-return gate rod 120, with the two swiveling end fittings rotated 90° relative to each other. The cylindrical holes in the balls of the swiveling end fittings 119 of the no-return gate assembly 50 are a close sliding fit to both the upwardly extending pin of the fourth eccentric arm 36 of the no-return gate assembly 50 and the no-return gate cylindrical pin 104 of the rotating pin plate 101. As seen in FIGS. 4 and 5, two no-return gate rods 120 interconnect the cylindrical pins 104 of the rotating pin plates 101 and the fourth eccentric arms 36 of the no-return gate halves 51, 55.

Figure 20:
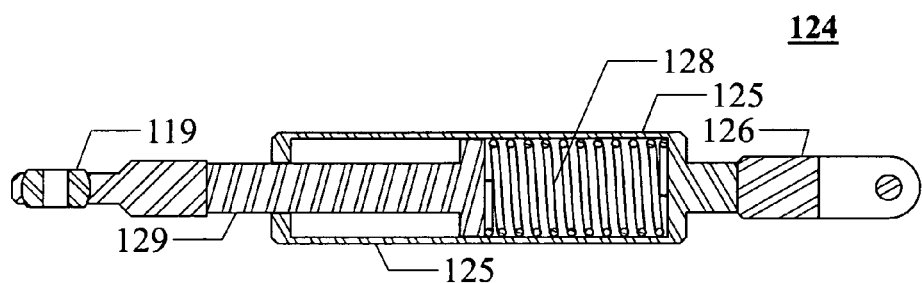
FIG. 20 is a longitudinal sectional view of the exit gate rod assembly in its axially compressed state.
Figure 21:
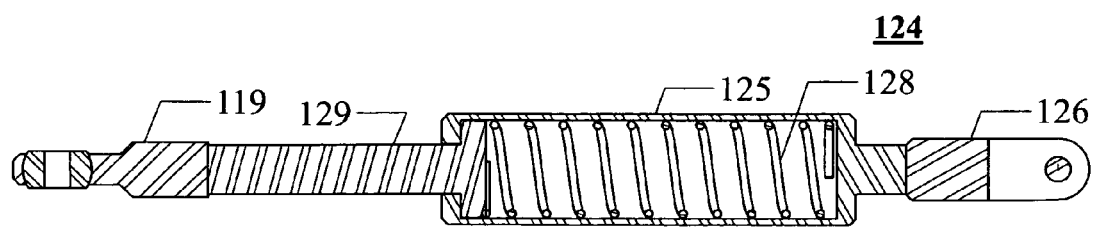
FIG. 21 is a view corresponding to FIG. 20, but showing the exit gate rod assembly in its uncompressed state.

The exit gate rod assembly 124 is shown in longitudinal cross-sectional views in FIGS. 20 and 21. The exit gate rod assembly 124 consists of a spring housing 125 having an attached jaw fitting 126 with a pin, a helical coil spring 128, a reciprocator 129, and a swiveling end fitting 119 attached to the distal end of the reciprocator 129. The spring housing 125 is basically an elongated hollow cylinder having a first closed transverse end and a second transverse end having a coaxial through hole. A short reduced diameter coaxial cylindrical extension extends outwardly from the closed first end of the spring housing 125.

Attached to the outer transverse end of the reduced diameter extension on the first end of the spring housing 125 is a jaw fitting 126. The jaw fitting 126 is an elongated rectangular prismatic piece with a first transverse end which is attached to the spring housing 125 and a second end which is radiused. As seen in FIGS. 14, 20, and 21, a rectangular slot extends approximately half of the length of the jaw fitting 126 from the second end and is symmetrically located on the vertical midplane of the part. A cylindrical pin mounted adjacent the second end of the jaw fitting 126 spans across the slot. When the exit gate rod assembly 124 is installed, the cylindrical pin of the jaw fitting 126 is engaged with the mounting hole 106 of the rotating pin plate 101.

The reciprocator 129 is a stepped right circular cylindrical element having a first short enlarged section which is a slip fit to the bore of the spring housing 125 and a coaxial elongated second section which is a slip fit to the coaxial through hole in the second end of the spring housing 125. At the outer end of the second section of the reciprocator 129, a swiveling end fitting 119 is coaxially mounted.

A helical spring 128 is fitted within the bore of the spring housing 125. The first end of the spring 128 bears on the closed interior end of the spring housing, and the second end of the spring bears on the outward transverse face of the enlarged first section of the reciprocator 129.

When mounted in the chute 10, the exit gate rod assembly 124 has its first end attached to the mounting hole 106 of the rotating pin plate 101 of the operator linkage assembly 100. The swiveling end fitting 119 on the second end of the exit gate rod assembly 124 is engaged with a vertically extending pin of a second eccentric arm 37 of either a righthand exit gate half 41 or a lefthand exit gate half 42.

The assembled exit gate rod assembly 124 is shown in its compressed condition in FIG. 20. This condition occurs when the rod assembly 124 is axially shortened by the rotation of the operator linkage assembly 100 due to the presence of an animal on the movable floor assembly while the exit gate assembly 40 is still latched. The assembled exit gate rod assembly 124 is shown in its extended condition in FIG. 21. This condition occurs following the unlatching of the drive bar 160 attached to the exit gate 40 as a result of the momentary energization of the solenoid 156. For the extended condition of the exit gate rod assembly 124, the spring 128 still strongly biases the reciprocator 129 against the second interior end of the spring housing 125.

Operation of the Invention

A cycle of chute operation begins with both the entry gate assembly 30 and the no-return gate assembly 50 open, the exit gate assembly 40 closed and latched by the spring driven engagement of the plunger 157 of the solenoid 156 in the detent 165 of the drive bar 160, and the movable floor assembly 23 in its raised position. This condition of the chute 10 is shown in FIG. 1. Calves readily can be induced to enter the open entry gate assembly 30 of the chute 10.

As the animal enters the chute, it begins to apply increasing rotational moment to the movable floor assembly 23. Once this moment begins to exceed the moment from the counterweights 110 of the linkage assembly and the friction of the gate assemblies 30, 40 and the linkage assemblies 100, the gate will begin to close. The weight of the counterweights 110 is preselected to be heavier than the average animal to be enclosed in the chute 10. Furthermore, the chute is designed such that the animal entering the chute has to be substantially past the no-return gate assembly 50 before the floor assembly 23 is depressed.

The no-return gate assembly 50 will permit passage of an animal into the chute 10 from its entry end, but it serves as a first barrier to the backing out of the animal. The moment of the animal's own weight on the movable floor assembly provides the holding force for the closed no-return gate assembly 50 and the closed entry gate assembly 30. The closure of the entry 30 and no-return 50 gate assemblies is gradual, as the animal moves into the chute 10, with the weight of the animal thereby developing a larger moment arm to pivot the movable floor assembly 23 downwardly to overcome the resistance of the counterweights 110. The position of the no-return gate assembly 50 relative to the hinge point for the movable floor assembly 23 ensures that the animal cannot open the gate by backing up.

Having the entry gate assembly 30 closed also prevents the entry of a second animal once the first animal is within the chute 10. The width of the chute 10 is such that the animal is unable to turn around to enable it to jump over the no-return gate assembly 50, and the closed entry gate assembly 30 provides a further barrier to exit.

Whenever the exit opening button 76 on the handheld control module 75 is depressed by an operator, a radio signal transmitted to the antenna of the control module 72 operates an internal switch in the module, causing it to apply battery voltage from the battery 73 to energize the solenoid 156. When the solenoid is energized, it retracts the solenoid plunger 157 from the solenoid detent hole 165 of the drive bar 160. This retraction permits the drive bar 160 to move in response to its being pulled in the direction of the exit gate 40 by the force of the compressed springs 128 of the exit gate rod assemblies 124 acting through the operator mechanical linkage components 80. The opening forces of the exit gate rod assemblies 124 on the exit gate assembly 40 are transmitted through the second eccentric arms 37 of the gate halves 41 and 42 and thence to upper third eccentric arms 34, the attached swing bars 170, and thereby to the drive bar 160.

Figure 8:
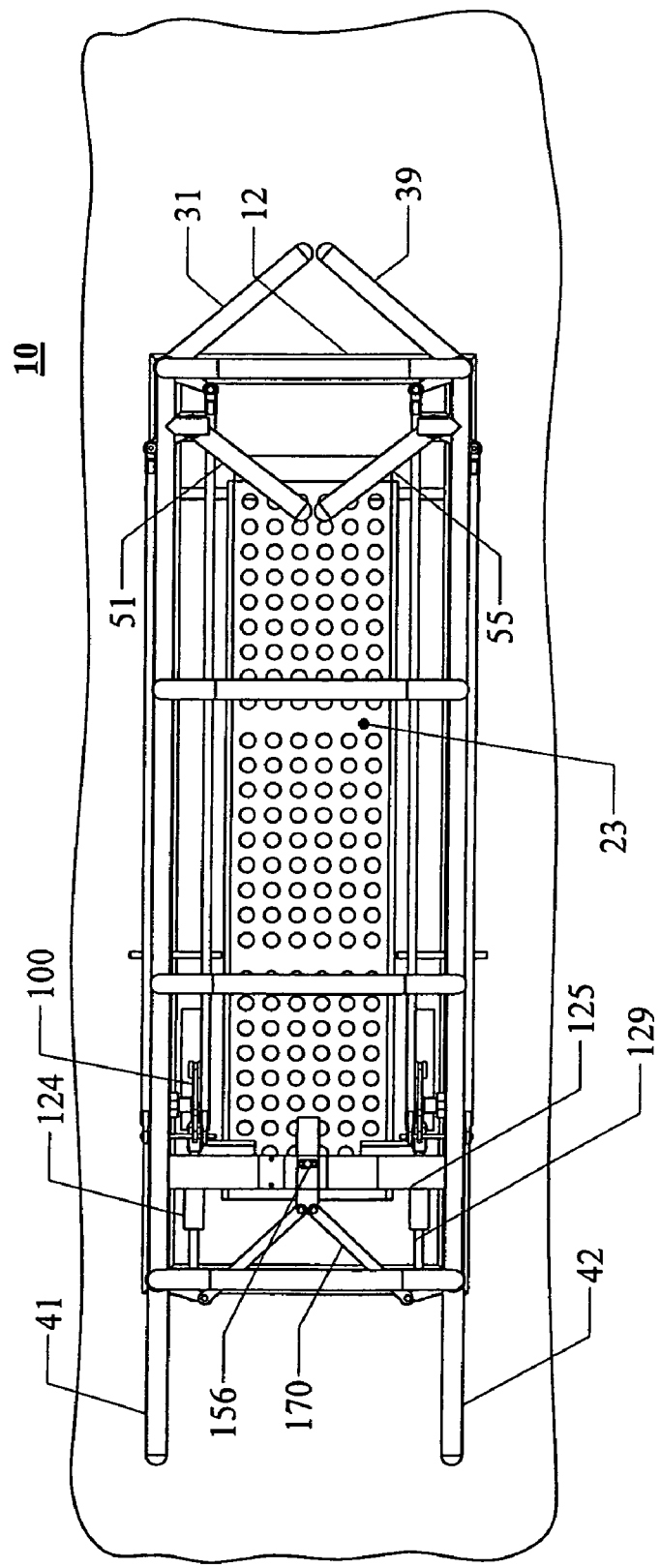
FIG. 8 is a plan view of the livestock chute with the entry gate and the no-return gate still closed by the weight of an animal depressing the movable floor assembly and the exit gate opened by a radio signal from a handheld device. For clarity, the protective covers removed.
Figure 10:
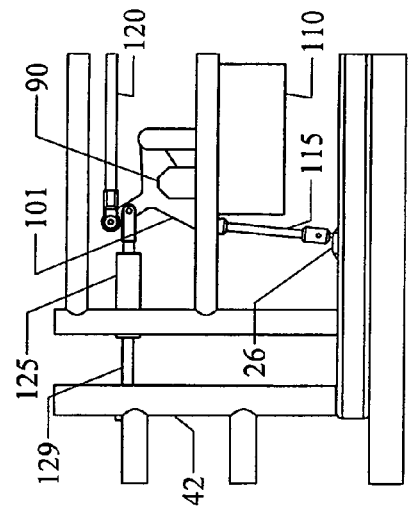
FIG. 10 is a detail view of the linkage assembly with the floor depressed and the exit gate closed.
Figure 9:
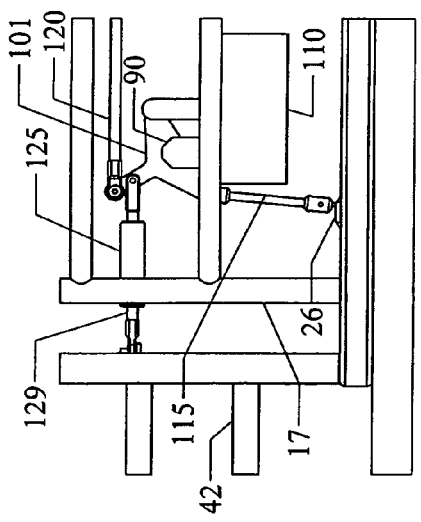
FIG. 9 is a detail view taken within the circle 9 of FIG. 3.
Figure 11:
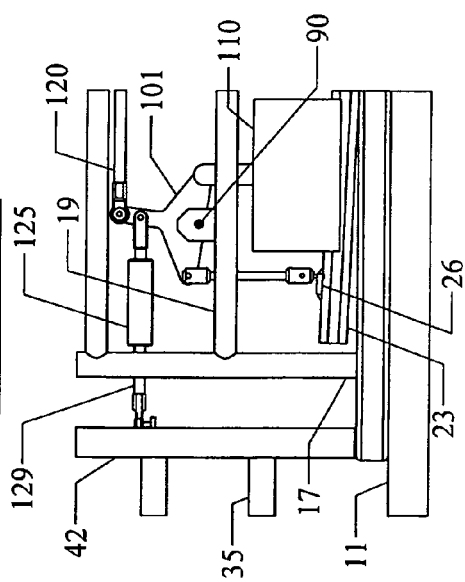
FIG. 11 is a detail view taken within the circle 11 of FIG. 7.
Figure 19:
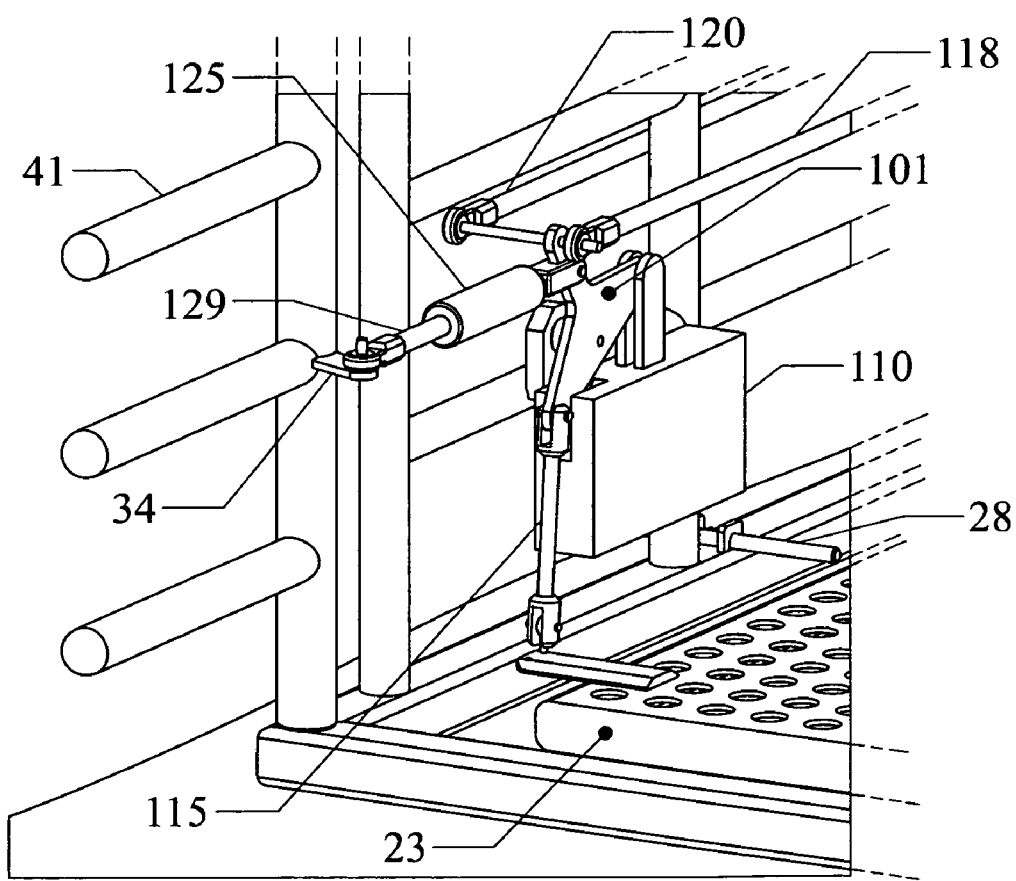
FIG. 19 is an oblique view of one side of the open exit gate, in which the movable floor assembly has been depressed by the weight of an animal and the remote control assembly has been activated to open the exit gat.

Following the opening of the exit gate 40, as seen in FIGS. 8 and 19, the animal will exit the chute 10. When the weight of the animal comes off the exit end of the movable floor assembly 23, it thereby permits the movable floor to move upwardly. The upward movement of the movable floor assembly 23 is due to upward urging by the counterweights 110 tending to rotate the rotating pin plates 101 of the linkage assemblies 100. Viewed from the lefthand side of the livestock chute 10, this rotation of the rotating pin plates 101 is clockwise. This upward motion of the movable floor assembly 23 is transmitted to the rotating pin plates 101 by the floor links 115.

The raising of the movable floor assembly 23 under its bias forces from the counterweights 110 and the associated concurrent opening of the entry 30 and no-return 50 gate assemblies thus happens simultaneously when the animal has stepped off the movable floor assembly 23. Plan view FIG. 2 shows the entry 30 and no-return 50 gate assemblies in their maximally open positions. At the same time as the entry gate 30 and the no-return gate open, the exit gate 40 shuts. This simultaneous shifting of all three gate assemblies 30, 40, 50 occurs because they are all linked to the rotating pin plates 101 of the linkage assemblies 100 by their respective gate rods 118, 120, and 124. Because the exit gate rod assemblies 124 are already extended, the tension applied to it by the raising of the movable floor assembly 23 does not further lengthen that rod assembly.

The closing force on the exit gate assembly 40 is not sufficient for the exiting animal to be bothered by the lateral force of the horizontal finger tubes 35. However, if necessary, a closing damper similar to that commonly used for doors can be used to slow the closure rate of the exit gate assembly 40 to permit the retained animal to escape before it is pressed by the horizontal finger tubes 35 of the gate.

In the event that it is desired to run cattle through the chute 10 without their being intimidated by closed gates, both the entry 30 and no-return 50 can be opened simultaneously by first removing any animal from the chute and extending the floor lock pins 28 until they prevent the movable floor assembly from lowering. Following this, the exit gate rod assemblies 124 can be disconnected from either their rotating pin plates 101 or from the second eccentric arms 37 of the exit gate assembly 40. The exit gate halves 41, 42 can then be propped open so that an animal will have unimpeded passage through the chute 10. These actions are reversible to return to normal gate operation for the chute 10.

If desired, an additional vertical hole can be added to both the drive bar 160 of the operator mechanical linkage components 80 and the solenoid mounting bar 64 of the primary structure 12. These holes would be made to be coaxial when the exit gate assembly 40 is fully open, thereby permitting the exit gate to be held open by the reversible insertion of a pin.

ADVANTAGES OF THE INVENTION

The primary advantages of the present invention lie in its robust mechanical design and its minimal reliance on battery power alone to operate its controls. The primary energy for the operation of the chute is derived from the weight of an animal depressing the movable floor assembly when passing into the chute. This energy is stored by elevating the counterweight of the operator linkage assemblies attached to the movable floor. The weight of the entering and retained animal also closes both the entry and the no-return gates, as well as preloading the springs of the exit gate rod assemblies. This is due to the connection of the three gate assemblies to the operator linkage assemblies which are rotated by the downward movement of the movable floor in response to the weight of the animal acting thereon.

The very short duration of the electric power applications to the solenoid of the operator mechanical linkage components attached to the exit gate, as well as the minimal power draw of the control module, lead to a requirement for only a small rechargeable battery to operate the chute over a very large number of opening and closing cycles. The handheld control module is substantially identical to most handheld units for garage door openers, so that it is readily available commercially. The mechanical components do not require tight fabrication tolerances, and the chute mechanisms are tolerant of long term exposure to the weather.

An additional advantage of the present invention is its ability easily to have both its entry and exit gates simultaneously opened. This feature is desirable when calves initially are being trained to run through the chute prior to the standard calf roping operation of metering individual calves through the chute.

A variety of modifications to the mechanical actuator assembly can be made without departing from the spirit of the invention. The primary frame structure and the gate structures can be configured differently than shown in the drawings. The no-return gate can be omitted, and other means of connection between the gates themselves and between the movable floor assembly and the entry gate can be utilized. These and several other modifications are possible without departing from the concept disclosed herein of using energy stored by elevating the counterweights to operate the gates, wherein the energy is derived from depression of an attached movable floor plate assembly by the weight of an animal held within the chute.

What is claimed is:

1. A cattle chute comprising:
   a. a base frame having two side walls and an entry passage on a first end of the base frame and an exit passage on a second end of the base frame;
   b. an entry gate hingedly mounted on the first end of the base frame and moveable between an open position and a closed position;
   c. an exit gate hingedly mounted on the second end of the base frame and moveable between an exit open position and an exit closed position;
   d. a floor disposed within the base frame having a first end of the floor pivotably mounted to the base frame proximal the entry gate and adjacent a ground area located under the base frame and a second end of the floor moveable between a raised position and a lowered position closer to the ground area than the raised position;
   e. a linkage assembly in communication with the entry gate, the exit gate, the floor, and a biasing mechanism for applying a first biasing force to keep the entry gate in the open position and to keep the exit gate closed, wherein a force applied by an animal stepping on the floor proximal the moveable second end moves the floor into the lowered position and overcomes the first biasing force to move the entry gate to the closed position and stores a second biasing force in a spring; and
   f. a release mechanism for releasing the stored second biasing force to open the exit gate.

2. The cattle chute of claim 1, wherein the entry gate and the exit gate have opposed righthand and lefthand halves, the righthand and lefthand halves being mounted on opposed side walls of the base frame.

3. The cattle chute of claim 1, further comprising a no-return gate in communication with the linkage assembly, wherein the no-return gate is open when the entry gate is open and closed when the entry gate is closed.

4. The cattle chute of claim 3, wherein the no-return gate has opposed righthand and lefthand halves, the righthand and lefthand halves being mounted on opposed side walls of the base frame proximal to the entry gate, wherein the no-return gate is open when the entry gate is open and closed when the entry gate is closed.

5. The cattle chute of claim 1, wherein the release mechanism is remotely operable.

6. The cattle chute of claim 1, wherein the linkage assembly is rotatable and pivotably mounted on the base frame.

7. The cattle chute of claim 6, wherein the linkage assembly includes:
   a rotatable operator device;
   the first biasing mechanism attached to the operator device biasing the rotation of the operator device in a first direction;
   a first link interconnecting the floor and the operator device, whereby when the floor is moved into the lowered position the first link rotates the operator device in a second direction and when the floor is in the raised position the operator device rotates in the first direction;
   a second link interconnecting the entry gate and the operator device, whereby when the operator device rotates in the first direction the entry gate is in its open position and when the operator device rotates in the second direction the entry gate is in its closed position; and
   a third link interconnecting the exit gate and the release mechanism with the operator device.

8. The cattle chute of claim 7, wherein the third link is attached to the operator device on a first end and to a pivotable shaft of the base frame on a second end and wherein the pivotable shaft is attached to the release mechanism and the exit gate.

9. The cattle chute of claim 8, wherein the exit gate is moved to the exit open position when the pivotable shaft is in a first shaft position and the exit gate is moved to the exit closed position when the pivotable shaft is in a second shaft position.

10. The cattle chute of claim 1, further comprising a locking mechanism for locking the exit gate and the entry gate open.

11. The cattle chute of claim 7, wherein the locking mechanism prevents the floor from moving into the lowered position.

12. The cattle chute of claim 1, wherein the first biasing force is a counterweight.

13. The cattle chute of claim 1, wherein the second biasing force is spring loaded.

14. A cattle chute comprising:
   a. a base frame having two side walls and an entry passage on a first end of the base frame and an exit passage on a second end of the base frame;
   b. an entry gate hingedly mounted on the first end of the base frame and moveable between an open position and a closed position;
   c. an exit gate hingedly mounted on the second end of the base frame and moveable between an exit open position and an exit closed position;
   d. a no-return gate hingedly mounted on the base frame proximal the entry gate and moveable between an open position and a closed position;
   e. a floor disposed within the base frame having a first end of the floor pivotably mounted to the base frame proximal the entry gate and adjacent a ground area located under the base frame and a second end of the floor moveable between a raised position and a lowered position closer to the ground area than the raised position;
   f. a linkage assembly in communication with the entry gate, the exit gate, the no-return gate, the floor, and a biasing mechanism for applying a first biasing force to keep both the entry gate and the no-return gate in their open positions and to keep the exit gate closed, wherein a force applied by an animal stepping on the floor proximal its moveable second end moves the floor into the lowered position and overcomes the first biasing force to move both the entry gate and the no-return gate to their closed positions and stores a second biasing force in a spring; and
   g. a remotely operable release mechanism for releasing the stored second biasing force to open the exit gate.

15. The cattle chute of claim 14, wherein the entry gate, the exit gate and the no-return gate have opposed righthand and lefthand halves, the righthand and lefthand halves being mounted on opposed side walls of the base frame.

16. The cattle chute of claim 14, wherein the no-return gate is open when the entry gate is open and closed when the entry gate is closed.

17. The cattle chute of claim 14, wherein the linkage assembly is rotatable and pivotably mounted on the base frame and includes:
   a rotatable operator device;

the first biasing mechanism attached to the operator device biasing the rotation of the operator device in a first direction;

a first link interconnecting the floor and the operator device, whereby when the floor is in the lowered position the first link rotates the operator device in a second direction and when the floor is in the raised position the first link rotates the operator device rotates in the first direction;

a second link interconnecting the entry gate and the operator device, whereby when the operator device rotates in the first direction the entry gate is, the open position and when the operator device rotates in the second direction the entry gate is in the closed position;

a third link interconnecting the no-return gate and the operator device, whereby when the operator device rotates in the first direction the no-return gate is in the open position and when the operator device rotates in the second direction the no-return gate is in the closed position; and a fourth link interconnecting the exit gate and the release mechanism with the operator device.

18. The cattle chute of claim 17, wherein the fourth link is attached to the operator device on a first end and to a pivotable shaft of the base frame on a second end and wherein the pivotable shaft is attached to the release mechanism and the exit gate.

19. The cattle chute of claim 18, wherein the exit gate is moved to the exit open position when the pivotable shaft is in a first shaft position and the exit gate is moved to the exit closed position when the pivotable shaft is in a second shaft position.

20. The cattle chute of claim 14, further comprising a locking mechanism for locking the exit gate and the entry gate open.

21. The cattle chute of claim 20, wherein the locking mechanism prevents the floor from moving into the lowered position.

22. The cattle chute of claim 14, wherein the first biasing force is a counterweight preselected to be less than a weight of the animal stepping on the floor.

23. A cattle chute comprising:
a. a base frame having two side walls and an entry passage on a first end of the base frame and an exit passage on a second end of the base frame;
b. an entry gate hingedly mounted on the first end of the base frame and moveable between an open position and a closed position;
c. an exit gate hingedly mounted on a pivotable shaft proximal the second end of the base frame, wherein the exit gate is in an exit open position when the pivotable shaft is in a first shaft position and in an exit closed position when the pivotable shaft is in a second shaft position;
d. a no-return gate hingedly mounted on the base frame proximal the entry gate and moveable between an open position and a closed position wherein the no-return gate is open when the entry gate is open and closed when the entry gate is closed;
e. a floor disposed within the base frame having a first end of the floor pivotably mounted to the base frame proximal the entry gate and adjacent a ground area located under the base frame and a second end of the floor moveable between a raised position and a lowered position closer to the ground area than the raised position;
f. a linkage assembly including (i) a rotatable operator device pivotably mounted on the base frame, (ii) a counterweight attached to the operator device biasing the rotation of the operator device in a first direction, (iii) a first link interconnecting the floor and the operator device, whereby when the floor is moved into the lowered position the first link rotates the operator device in a second direction, (iv) a second link interconnecting the entry gate and the operator device, whereby when the operator device rotates in the first direction the entry gate opens and when the operator device rotates in the second direction the entry gate closes, (v) a third link interconnecting the no-return gate and the operator device, whereby when the operator device rotates in the first direction the no-return gate opens and when the operator device rotates in the second direction the no-return gate closes, and (vi) a fourth link interconnecting the pivotable shaft with the operator device, whereby when the operator device rotates in the second direction the fourth link stores a second biasing force in a spring; and
g. a release mechanism attached to the pivotable shaft for releasing the stored second biasing force to move the pivotable shaft to the first shaft position and open the exit gate.

* * * * *